(12) United States Patent
Park et al.

(10) Patent No.: US 10,311,774 B2
(45) Date of Patent: Jun. 4, 2019

(54) DISPLAY APPARATUS

(71) Applicant: Samsung Display Co., Ltd., Yongin-si, Gyeonggi-do (KR)

(72) Inventors: Minwook Park, Hwaseong-si (KR); Donghee Ye, Daegu (KR); Jikhan Jung, Seoul (KR)

(73) Assignee: Samsung Display Co., Ltd. (KR)

( * ) Notice: Subject to any disclaimer, the term of this patent is extended or adjusted under 35 U.S.C. 154(b) by 139 days.

(21) Appl. No.: 15/414,319

(22) Filed: Jan. 24, 2017

(65) Prior Publication Data
US 2017/0287381 A1 Oct. 5, 2017

(30) Foreign Application Priority Data
Apr. 5, 2016 (KR) ........................ 10-2016-0041850

(51) Int. Cl.
| | |
|---|---|
| *G09G 3/20* | (2006.01) |
| *G02F 1/1335* | (2006.01) |
| *G02F 1/1345* | (2006.01) |
| *G09G 3/36* | (2006.01) |
| *G09G 3/34* | (2006.01) |

(52) U.S. Cl.
CPC ....... *G09G 3/2092* (2013.01); *G02F 1/13454* (2013.01); *G02F 1/133512* (2013.01); *G09G 3/3677* (2013.01); *G09G 3/3406* (2013.01); *G09G 2300/0408* (2013.01); *G09G 2310/0278* (2013.01); *G09G 2310/08* (2013.01); *G09G 2320/0233* (2013.01)

(58) Field of Classification Search
CPC .. G09G 3/2092; G09G 3/3677; G09G 3/3406; G09G 2300/0408; G09G 2310/0278; G09G 2310/08; G09G 2320/0233; G02F 1/133512; G02F 1/13454
See application file for complete search history.

(56) References Cited

U.S. PATENT DOCUMENTS

| | | | | |
|---|---|---|---|---|
| 2013/0321499 | A1* | 12/2013 | Park | G09G 3/20 345/698 |
| 2014/0078123 | A1* | 3/2014 | Park | G09G 3/20 345/205 |
| 2014/0285511 | A1* | 9/2014 | Hoshino | G09G 5/10 345/590 |
| 2015/0161928 | A1 | 6/2015 | Kim et al. | |

(Continued)

FOREIGN PATENT DOCUMENTS

| | | |
|---|---|---|
| EP | 3038076 A1 | 6/2016 |
| KR | 10-2005-0054312 A | 6/2005 |

(Continued)

*Primary Examiner* — Sahlu Okebato
(74) *Attorney, Agent, or Firm* — Innovation Counsel LLP

(57) ABSTRACT

A display apparatus includes a display panel including first, second, and third display parts and a gate driver. The gate driver includes a first gate circuit disposed in a non-display part of the display panel and a second gate circuit disposed in the first display part of the display panel and applies a gate signal to a gate line. The first, second, and third display parts include first, second, and third light blocking parts, respectively. The second light blocking part has an area smaller than an area of the first light blocking part and greater than an area of the third light blocking part.

25 Claims, 19 Drawing Sheets

(56) References Cited

U.S. PATENT DOCUMENTS

2015/0234246 A1* 8/2015 Wang ................ G02F 1/136286
349/46
2017/0159779 A1* 6/2017 Hwang ................ F16H 37/042

FOREIGN PATENT DOCUMENTS

| KR | 10-2013-0135043 A | 12/2013 |
| KR | 10-2015-0123984 A | 11/2015 |
| KR | 10-2016-0002511 A | 1/2016 |
| WO | 2015045710 A1 | 4/2015 |

* cited by examiner

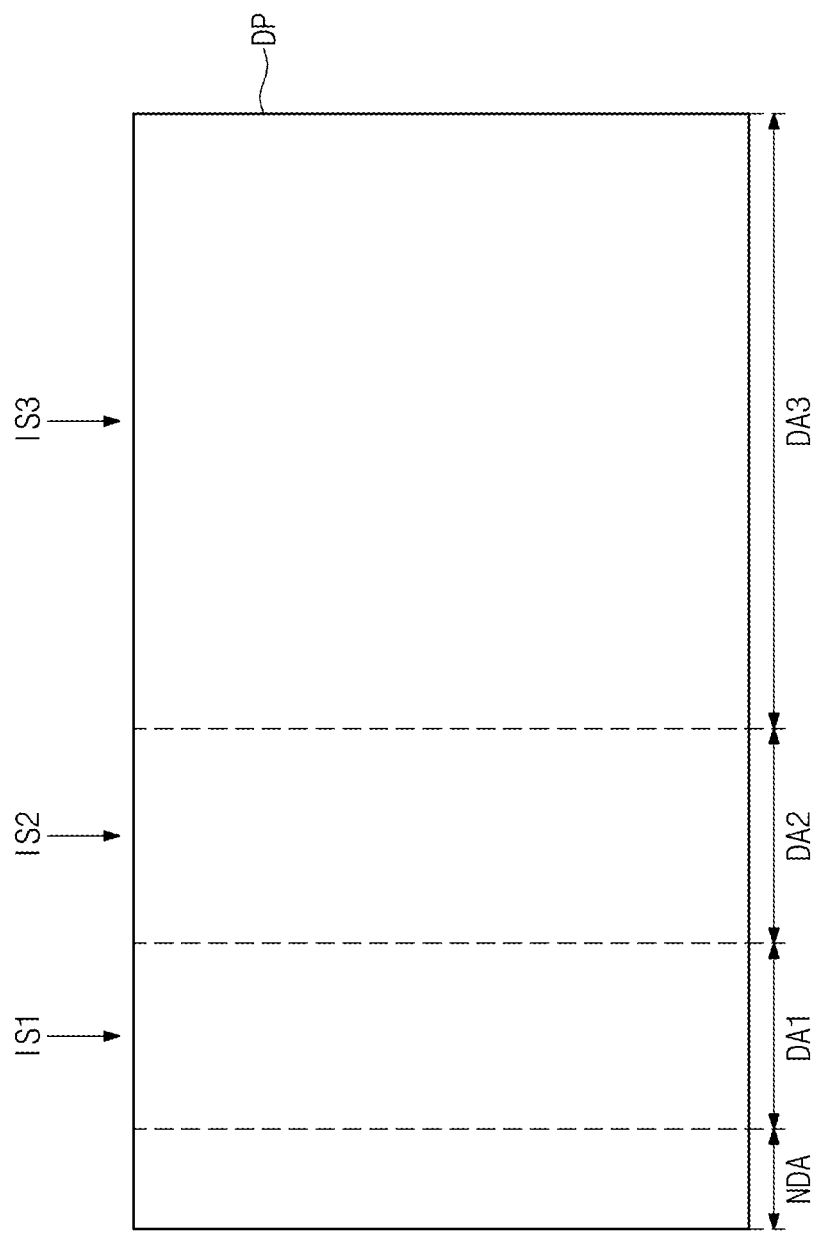

DISPLAY APPARATUS

CROSS-REFERENCE TO RELATED APPLICATION

This U.S. non-provisional patent application claims priority under 35 U.S.C. § 119 of Korean Patent Application No. 10-2016-0041850, filed on Apr. 5, 2016, the contents of which are hereby incorporated by reference in its entirety.

BACKGROUND

1. Field of Disclosure

The present disclosure relates to a display apparatus having a narrow bezel.

2. Description of the Related Art

A flat display panel is typically classified into a light-emitting type and a light-receiving type. The light-emitting type of flat display panel includes, for example, a plasma display panel and an organic light emitting display panel.

The flat panel display panel includes a plurality of pixels and a gate driver driving the pixels. In general, the gate driver is disposed in a non-display region adjacent to a display region in which the pixels are arranged. The display panel has a bezel width corresponding to the non-display region.

SUMMARY

The present disclosure provides a display apparatus having a narrow bezel width.

Embodiments of the inventive concept provide a display apparatus including a display panel including a gate line extending in one direction, a non-display part, a first display part, a third display part, and a second display part disposed between the first and third display parts and a gate driver including a first gate circuit disposed in the non-display part and a second gate circuit disposed in the first display part and applying a gate signal to the gate line. The first display part includes a first pixel including a first pixel electrode, a first pixel circuit driving the first pixel electrode, and a first light blocking part overlapped with the first pixel circuit and the second gate circuit, the second display part includes a second pixel including a second pixel electrode, a second pixel circuit driving the second pixel electrode, and a second light blocking part overlapped with the second pixel circuit, the third display part includes a third pixel including a third pixel electrode, a third pixel circuit driving the third pixel electrode, and a third light blocking part overlapped with the third pixel circuit, and an area of the second light blocking part is smaller than an area of the first light blocking part and greater than an area of the third light blocking part.

The gate line is provided in a plural number, and the second gate circuit is disposed between adjacent gate lines to each other among the gate lines.

The second gate circuit includes a first transistor including an input terminal connected to a clock line and an output terminal connected to the gate line.

The second gate circuit further includes a second transistor including an input terminal connected to a low voltage line and an output terminal connected to the output terminal of the first transistor.

The second pixel electrode has an area greater than an area of the first pixel electrode and smaller than an area of the third pixel electrode.

The gate driver further includes a third gate circuit disposed in the second display part, and the second light blocking part is overlapped with the third gate circuit.

An area in which the third gate circuit is disposed is smaller than an area in which the second gate circuit is disposed.

The number of transistors included in the third gate circuit is smaller than the number of transistors included in the second gate circuit.

The display panel further includes a clock line receiving a clock signal and a low voltage line receiving a low voltage, the gate driver further includes a plurality of second transistors, each of the second transistors includes an input terminal connected to the low voltage line and an output terminal connected to the gate line, the second gate circuit includes a first transistor including an input terminal connected to the clock line and an output terminal connected to the gate line, and the third gate circuit includes at least one second transistor among the second transistors.

At least a portion of the low voltage line and at least a portion of the clock line are disposed in the first and second display parts.

The second gate circuit includes at least another second transistor among the second transistors.

The display panel further includes a plurality of data lines extending in another direction different from the one direction, the second gate circuit is provided in a plural number, an i-th second gate circuit in the one direction among the second gate circuits is disposed between an i-th data line and an (i+1)-th data line among the data lines, and the number "i" is an integer equal to or greater than 1.

The third gate circuit is provided in a plural number, a third gate circuit in the one direction among the third gate circuits is disposed between a j-th data line and a (j+1)-th data line among the data lines, and the number "j" is an integer greater than the number "i".

The gate line is provided in a plural number, a k-th second gate circuit in the another direction different from the one direction among the second gate circuits is disposed between a k-th gate line and a (k+1)-th gate line among the gate lines, and the number "k" is an integer greater than 1.

Each of the first display part and the second display part is provided in a plural number, and the first display parts, the second display parts, and the third display part are arranged in order of the first display part, the second display part, the third display part, the second display part, and the first display part along the one direction.

Each of the first, second, and third display parts is provided in a plural number, and the first, second, and third display parts are arranged in order of the first display part, the second display part, the third display part, the second display part, the first display part, the second display part, the third display part, the second display part, and the first display part along the one direction.

The display apparatus further includes a backlight unit configured to include a first part providing a first light to the first display part, a second part providing a second light to the second display part, and a third part providing a third light to the third display part. The second light has an intensity smaller than an intensity of the first light and greater than an intensity of the third light.

First, second, and third image signals are respectively applied to the first, second, and third display parts, and the second image signal has a brightness value smaller than a brightness value of the first image signal and greater than a brightness value of the third image signal with respect to a same grayscale value.

Embodiments of the inventive concept provide a display apparatus including a display panel including a gate line extending in one direction, a non-display part, a first display part, a third display part, and a second display part disposed between the first and third display parts and a gate driver including a first gate circuit disposed in the non-display part and a second gate circuit disposed in the first display part. The gate driver is not disposed in the third display part and applies a gate signal to the gate line, and the second display part has a transmittance greater than a transmittance of the first display part and smaller than a transmittance of the third display part.

Embodiments of the inventive concept provide a display apparatus including a display panel including a gate line extending in one direction, a first display part, a third display part, and a second display part disposed between the first and third display parts and a gate driver including a first gate circuit disposed in the first display part and a second gate circuit disposed in the second display part. The gate driver is not disposed in the third display part and applies a gate signal to the gate line. A relationship of N1>N2 or R1>R2 is satisfied, the number N1 denotes a number of transistors of the first gate circuit, the number N2 denotes a number of transistors of the second gate circuit, the number R1 denotes an area in which the first gate circuit is disposed, and the number R2 denotes an area in which the second gate circuit 250 is disposed.

Embodiments of the inventive concept provide a display apparatus including a display panel including a gate line extending in one direction, a non-display part, a first display part, a third display part, a second display part disposed between the first and third display parts, and a gate driver comprising a first gate circuit disposed in the non-display part and a second gate circuit disposed in the first display part. The gate driver is not disposed in the third display part and applies a gate signal to the gate line. The first display part comprises a first pixel of a first type, the second display part comprises a second pixel of a second type, the third display part comprises a third pixel of a third type, and an aperture ratio of the second pixel is greater than an aperture ratio of the first pixel and smaller than an aperture ratio of the third pixel.

Each pixel has a light blocking part and a display area that is not overlapped with the light blocking part, and the aperture ratio of each pixel is a ratio of the display area and the area of the light block part.

Each pixel column contains pixels of the same pixel type. One or more contiguous columns of pixels of the first type form the first display part, one or more contiguous columns of pixels of the second type form the second display part, and one or more contiguous columns of pixels of the third type form the third display part.

The display panel is apportioned into a plurality of display parts along a pixel row direction, and the plurality of display parts are arranged in order of the first display part, the second display part, the third display part, the second display part, and the first display part along the pixel row direction.

The display panel is apportioned into a plurality of display parts along a pixel row direction, and the plurality of display parts are arranged in order of the first display part, the second display part, the third display part, the second display part, the first display part, the second display part, the third display part, the second display part, and the first display part along the pixel row direction.

According to the above, the second gate circuit of the gate driver is disposed in the first display part, and thus the bezel width of the display apparatus may be reduced.

The area of the second light blocking part is smaller than the area of the first light blocking part and greater than the area of the third light blocking part. Accordingly, the boundary between the first and third display parts may be prevented from being recognized, which is caused by the difference in transmittance between the first and third display parts when the second gate circuit is disposed in the first display part. As a result, the display quality of the display apparatus may be improved.

BRIEF DESCRIPTION OF THE DRAWINGS

The above and other advantages of the present disclosure will become readily apparent by reference to the following detailed description when considered in conjunction with the accompanying drawings wherein:

FIG. 13 is a view showing a display panel according to an exemplary embodiment of the present disclosure.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these details are to be regarded as merely exemplary. Accordingly, those of ordinary skill in the art would recognize that various changes and modifications of the various embodiments described herein be made without departing from the scope and spirit of the present disclosure. Like numbers refer to like elements throughout.

Hereinafter, the present invention is explained in detail with reference to the accompanying drawings.

Figure 1:
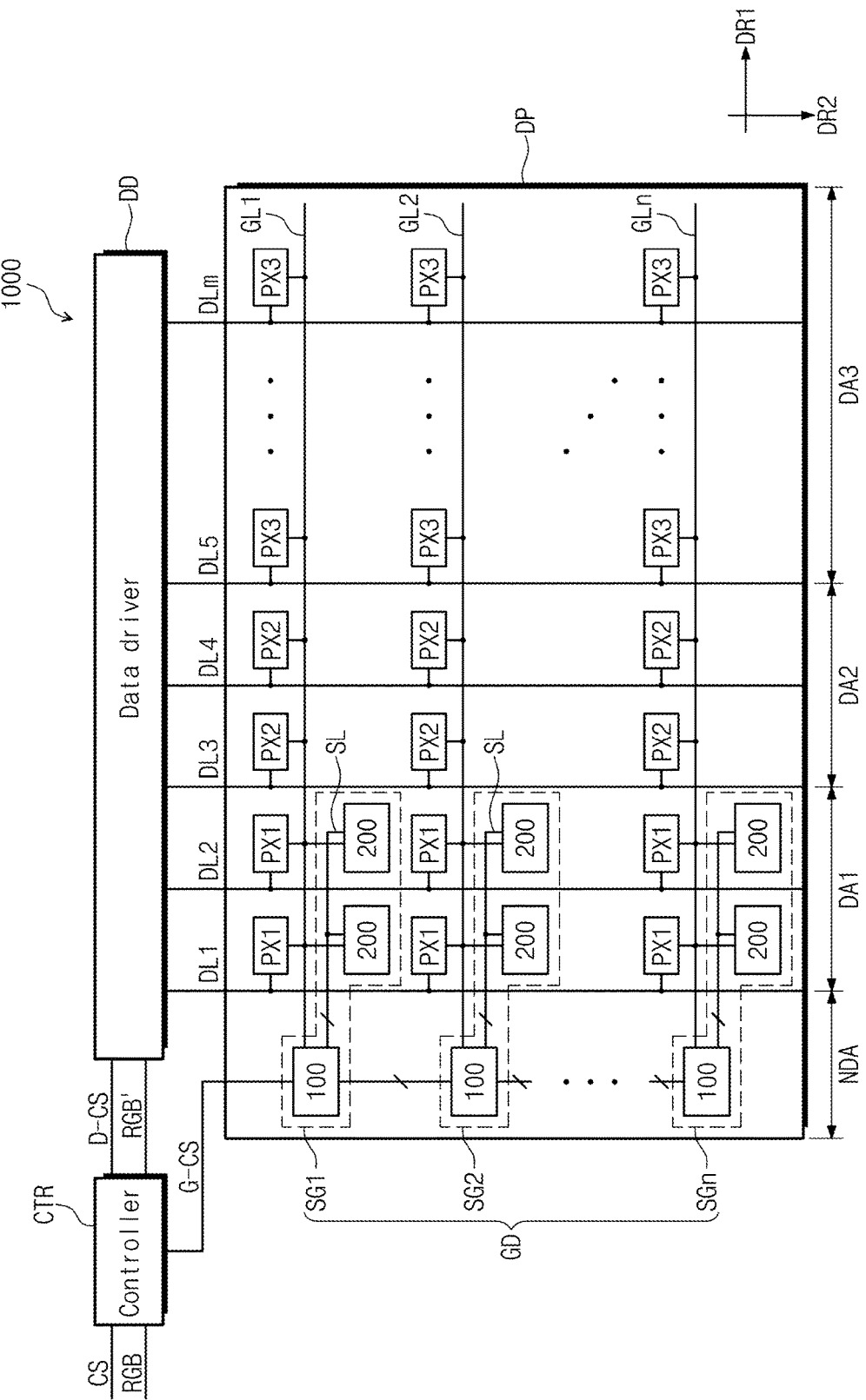
FIG. 1 is a plan view showing a display apparatus according to an exemplary embodiment of the present disclosure.

FIG. 1 is a plan view showing a display apparatus 1000 according to an exemplary embodiment of the present disclosure.

Referring to FIG. 1, the display apparatus 1000 includes a display panel DP displaying an image and a panel driver driving the display panel DP. The panel driver includes a gate driver GD, a data driver DD, and a controller CTR controlling the gate driver GD and the data driver DD.

The controller CTR receives a plurality of control signals CS and input image data RGB containing information on the image. The controller CTR converts the input image data RGB to output image data RGB' appropriate to an interface between the data driver DD and the display panel DP and applies the output image data RGB' to the data driver DD. In addition, the controller CTR generates a data control signal D-CS (e.g., an output start signal, a horizontal start signal, etc.) and a gate control signal G-CS on the basis of the control signals CS. The data control signal D-CS is applied to the data driver DD, and the gate control signal G-CS is applied to the gate driver GD.

The gate driver GD sequentially outputs gate signals in response to the gate control signal G-CS provided from the controller CTR.

The data driver DD converts the output image data RGB' to data voltages in response to the data control signal D-CS provided from the controller CTR and outputs the data voltages. The data voltages are applied to the display panel DP.

The display panel DP includes a plurality of gate lines GL1 to GLn, a plurality of data lines DL1 to DLm (where n and m are natural numbers), signal lines SL, and a plurality of pixels. The display panel DP may be, but not limited to, a flat display panel, such as an organic light emitting display panel including an organic light emitting layer or a liquid crystal display panel including a liquid crystal layer. The gate lines GL1 to GLn extend in a first direction DR1 and are arranged in a second direction DR2 to be substantially parallel to each other. The data lines DL1 to DLm are insulated from the gate lines GL1 to GLn that cross the data lines DL1 to DLm. For instance, the data lines DL1 to DLm extend in the second direction DR2 and are arranged in the first direction DR1 to be substantially parallel to each other. The first direction DR1 may be substantially perpendicular to the second direction DR2. In the following descriptions, the first and second directions DR1 and DR2 may be respectively referred to as one direction and the other direction.

Each of the pixels displays one of three primary colors of red, green, and blue colors. The colors displayed by the pixels are not limited thereto or thereby, and the pixels may further display various colors, e.g., yellow, cyan, and magenta colors, in addition to the red, green, and blue colors. The pixels are arranged in a matrix form along the first and second directions DR1 and DR2.

Each of the pixels is connected to a corresponding data line of the data lines DL1 to DLm and a corresponding gate line of the gate lines GL1 to GLn.

In the present exemplary embodiment, the display panel DP includes a non-display part NDA and a display part. The display part displays the image, and the non-display part NDA does not display the image. The pixels are disposed in the display part. The pixels are not disposed in the non-display part NDA, and a circuit used to drive the pixels is disposed in the non-display part NDA.

The display part includes first, second, and third display parts DA1, DA2, and DA3. The second display part DA2 is disposed between the first and third display parts DA1 and DA3. The non-display part NDA is disposed at a left end of the display panel DP.

As an example, the parts may be arranged in order of "the non-display part NDA/the first display part DA1/the second display part DA2/the third display part DA3" in the first direction DR1.

As an example, the pixels include first, second, and third pixels PX1, PX2, and PX3. The first to third display parts DA1 to DA3 include the first to third pixels PX1 to PX3, respectively.

As an example, the gate driver GD may be implemented by "in-pixel gate driver". Accordingly, at least a portion of the gate driver GD may be disposed in the part in which the pixels are disposed. As an example, the gate driver GD includes a first gate circuit 100 disposed in the non-display part NDA and a second gate circuit 200 disposed in the first display part DA1. Each of the first and second gate circuits 100 and 200 may be provided in a plural number.

The first gate circuits 100 are arranged in the second direction DR2 to respectively correspond to the gate lines GL1 to GLn.

The second gate circuits 200 are arranged in a matrix form to correspond to the first pixels PX1. In more detail, an i-th second gate circuit in the first direction DR1 among the second gate circuits 200 is disposed between an i-th data line and an (i+1)-th data line among the data lines DL1 to DLm, and a k-th second gate circuit in the second direction DR2 among the second gate circuits 200 is disposed between a k-th gate line and a (k+1)-th gate line among the gate lines GL1 to GLn. Each of "i" and "k" is an integer number equal to or greater than 1, with i<m and k<n.

The display panel DP includes first to n-th stages SG1 to SGn connected to each other in series. An k-th stage may be configured to include the first and second gate circuits 100 and 200 disposed in an k-th row. The first and second gate circuits 100 and 200 disposed in the k-th row are connected to each other by the signal line SL. The first to n-th stages SG1 to SGn are respectively connected to the gate lines GL1 to GLn to respectively apply first to n-th gate signals to the gate lines GL1 to GLn.

In the present exemplary embodiment, each of the first to n-th stages SG1 to SGn includes two second gate circuits 200, but it is not limited thereto or thereby. That is, each of the first to n-th stages SG1 to SGn may include q or more second gate circuits 200. The number "q" is an integer equal to or greater than 3.

The number "q" is determined depending on a characteristic of each of the gate lines GL1 to GLn. The characteristic of each of the gate lines GL1 to GLn may be, but not limited to, an impedance characteristic. For instance, as the impedance of the gate lines GL1 to GLn increases, the number "q" increases.

If the gate driver GD is implemented by the in-pixel gate driver, the second gate circuits 200 are distributed and arranged in the first display part DA1, and thus, an area in which the second gate circuits 200 are disposed is not required. Thus, a width of the non-display part NDA, i.e., a bezel width, may be reduced.

Figure 2A:
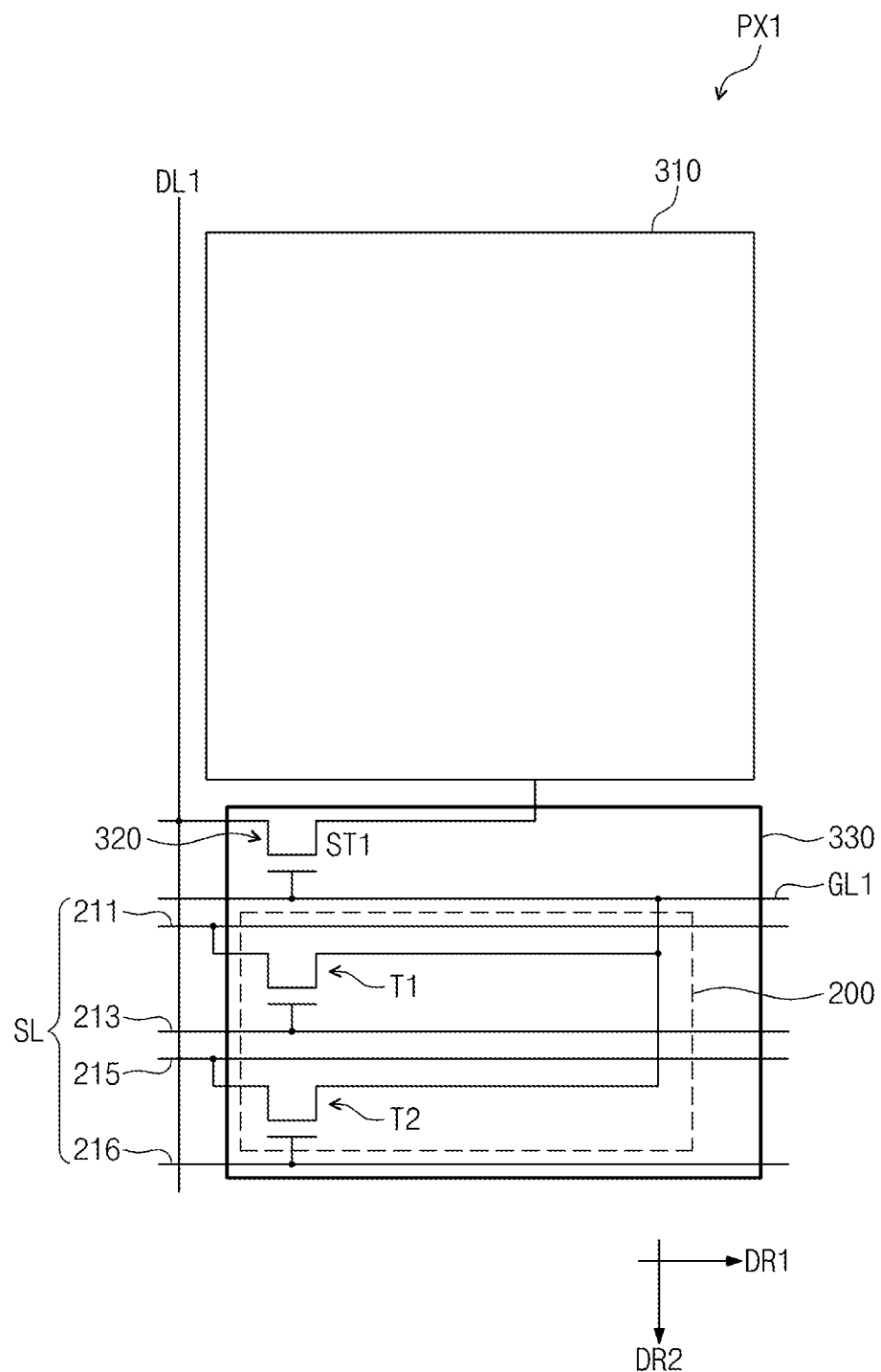
FIG. 2A is a view showing a first pixel shown in FIG. 1.
Figure 2B:
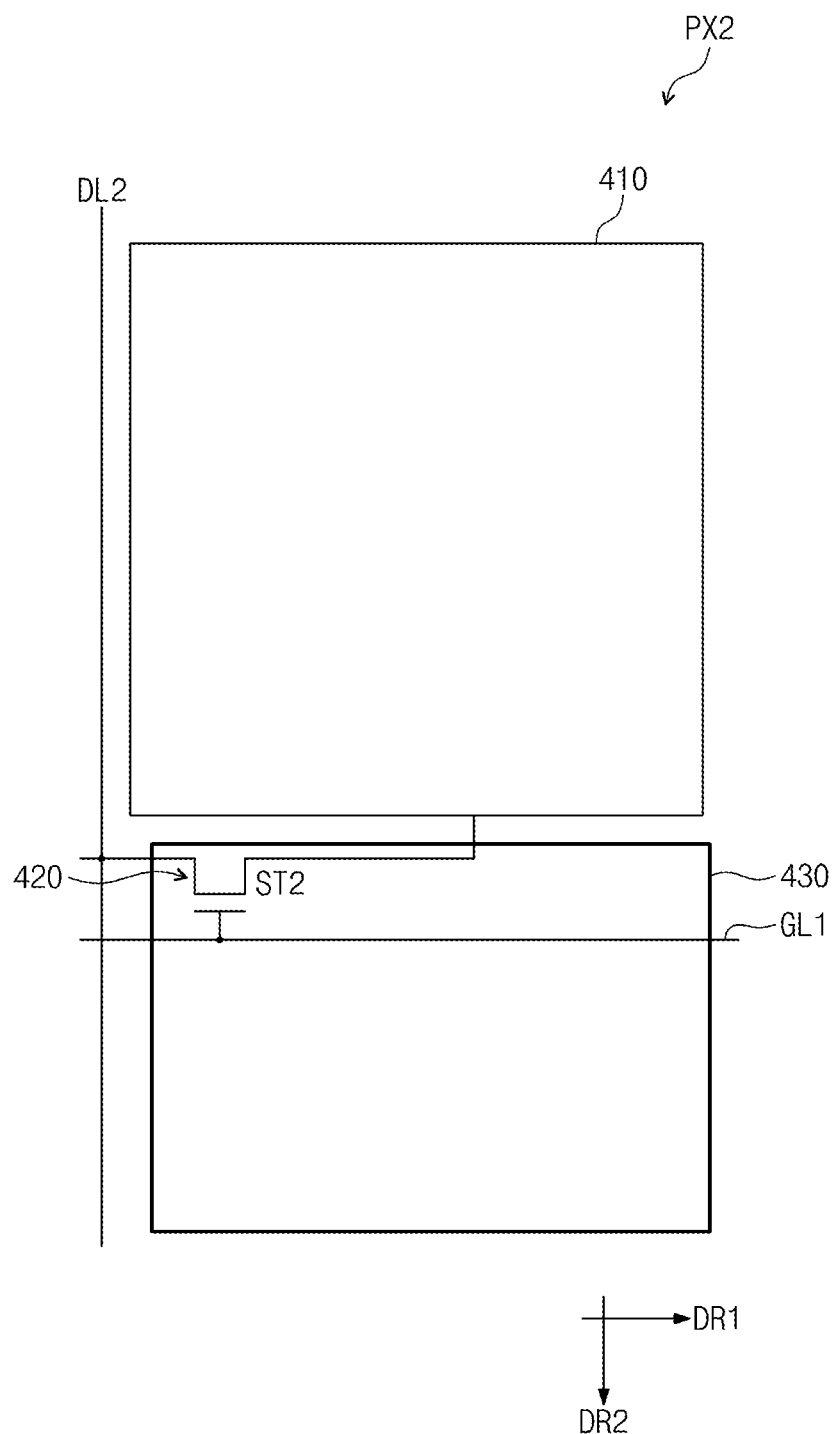
FIG. 2B is a view showing a second pixel shown in FIG. 1.
Figure 2C:
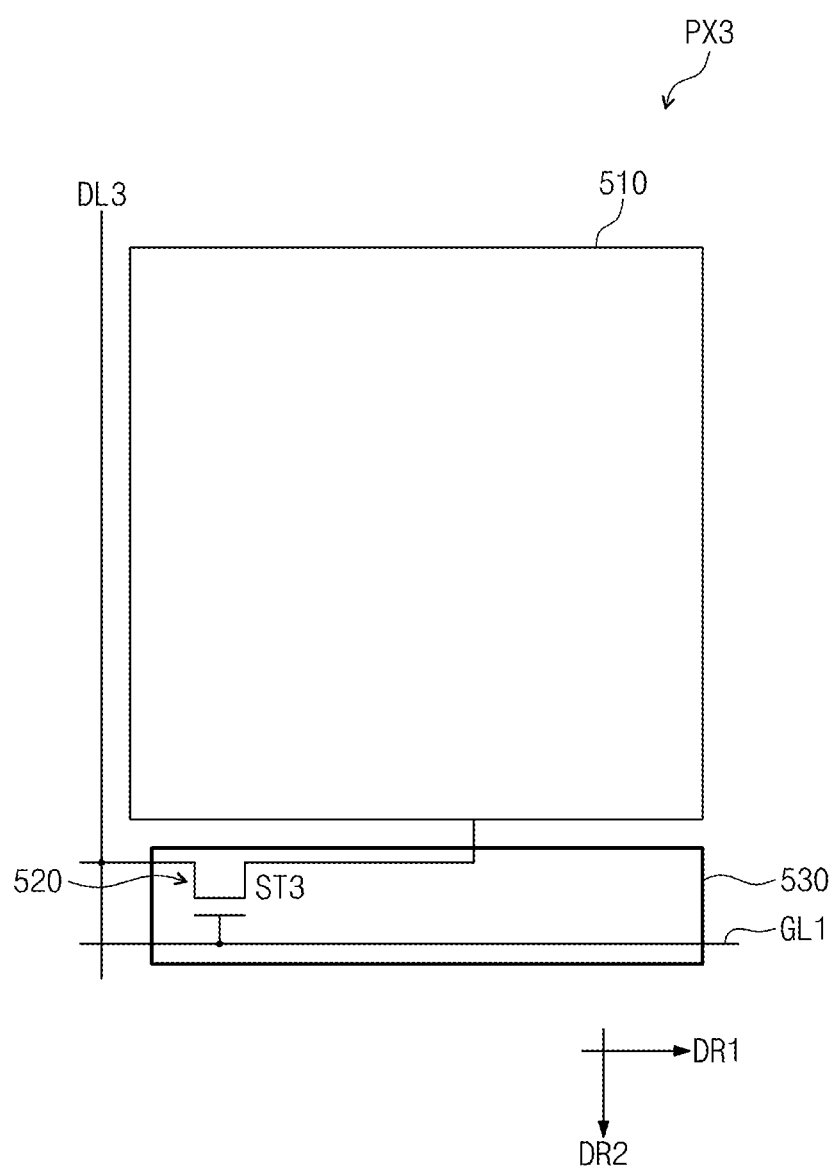
FIG. 2C is a view showing a third pixel shown in FIG. 1.

FIG. 2A is a view showing the first pixel PX1 shown in FIG. 1, FIG. 2B is a view showing the second pixel PX2 shown in FIG. 1, and FIG. 2C is a view showing the third pixel PX3 shown in FIG. 1.

Referring to FIG. 2A, the first pixel PX1 includes a first pixel electrode 310, a first pixel circuit 320, and a first light blocking part 330.

The first pixel electrode 310 may be, for example, a transmissive electrode or a reflective electrode.

In the present exemplary embodiment, the first pixel circuit 320 is connected to the first gate line GL1 and the first data line DL1 to drive the first pixel electrode 310. The first pixel circuit 320 includes a first switching transistor ST1. The first switching transistor ST1 includes an input terminal connected to the first data line DL1, a control terminal connected to the first gate line GL1, and an output terminal connected to the first pixel electrode 310. However, the first pixel circuit 320 may include two or more transistors, may be further connected to other lines in addition to the data line and the gate line, and may be implemented in various ways.

The first light blocking part 330 is disposed to overlap with the second gate circuit 200 when viewed in a plan view such that at least the second gate circuit 200 is not visible.

The second gate circuit 200 is disposed spaced apart from the first pixel electrode 310 in the second direction DR2. The second gate circuit 200 includes the signal line SL, a first transistor T1, and a second transistor T2. In the present exemplary embodiment, the signal line SL includes an on-switching line 213, an off-switching line 216, a low voltage line 215, and a clock line 211. In the present exemplary embodiment, at least a portion of each of the on-switching line 213, the off-switching line 216, the low voltage line 215, and the clock line 211 is overlapped with the first light blocking part 330 when viewed in a plan view. The first transistor T1 applies the first gate signal of high voltage to the first gate line GL1. An input terminal of the first transistor T1 is connected to the clock line 211 to receive a first clock signal from the clock line 211. A control terminal of the first transistor T1 is connected to the on-switching line 213 to receive a Q-node signal from the on-switching line 213. An output terminal of the first transistor T1 is connected to the first gate line GL1.

The second transistor T2 applies the first gate line of low voltage to the first gate line GL1. An input terminal of the second transistor T2 is connected to the low voltage line 215 to receive the low voltage from the low voltage line 215. A control terminal of the second transistor T2 is connected to the off-switching line 216. The control terminal of the second transistor T2 receives a second gate signal of the second gate line GL2 (shown in FIG. 1) from the off-switching line 216. An output terminal of the second transistor T2 is connected to the output terminal of the first transistor T1.

The first transistor T1 outputs the high voltage of the first clock signal to the first gate line GL1 as the high voltage of the gate voltage in response to the Q-node signal, and the second transistor T2 outputs the low voltage to the first gate line GL1 as the low voltage of the gate voltage in response to the second gate signal of the second gate line GL2 after a predetermined time lapses. The first switching transistor ST1 is turned on in response to the high voltage and applies the data voltage from the first data line DL1 to the first pixel electrode 310. The first switching transistor ST1 may be turned off in response to the low voltage.

Referring to FIG. 2B, the second pixel PX2 includes a second pixel electrode 410, a second pixel circuit 420, and a second light blocking part 430.

The second pixel electrode 410 may be, for example, a transmissive electrode or a reflective electrode.

In the present exemplary embodiment, the second pixel circuit 420 is connected to the first gate line GL1 and the second data line DL2 to drive the second pixel electrode 410. The second pixel circuit 420 includes a second switching transistor ST2. The second switching transistor ST2 includes an input terminal connected to the second data line DL2, a control terminal connected to the first gate line GL1, and an output terminal connected to the second pixel electrode 410.

The second switching transistor ST2 receives the first gate signal from the first gate line GL1. The second switching transistor ST2 is turned on in response to the high voltage of the first gate signal and applies the data voltage provided from the second data line DL2 to the second pixel electrode 410. The second switching transistor ST2 may be turned off in response to the low voltage of the first gate signal.

The second light blocking part 430 is disposed to overlap with the second switching transistor ST2 when viewed in a plan view such that at least the second switching transistor ST2 is not visible.

Referring to FIG. 2C, the third pixel PX3 includes a third pixel electrode 510, a third pixel circuit 520, and a third light blocking part 530.

The third pixel electrode 510 may be, for example, a transmissive electrode or a reflective electrode.

In the present exemplary embodiment, the third pixel circuit 520 is connected to the first gate line GL1 and the third data line DL3 to drive the third pixel electrode 510. The third pixel circuit 520 includes a third switching transistor ST3. The third switching transistor ST3 includes an input terminal connected to the third data line DL3, a control terminal connected to the first gate line GL1, and an output terminal connected to the third pixel electrode 510.

The third switching transistor ST3 receives the first gate signal from the first gate line GL1. The third switching transistor ST3 is turned on in response to the high voltage of the first gate signal and applies the data voltage provided from the third data line DL3 to the third pixel electrode 510. The third switching transistor ST3 may be turned off in response to the low voltage of the first gate signal.

The third light blocking part 530 is disposed to overlap with the third switching transistor ST3 when viewed in a plan view such that at least the third switching transistor ST3 is not visible.

Figure 3A:
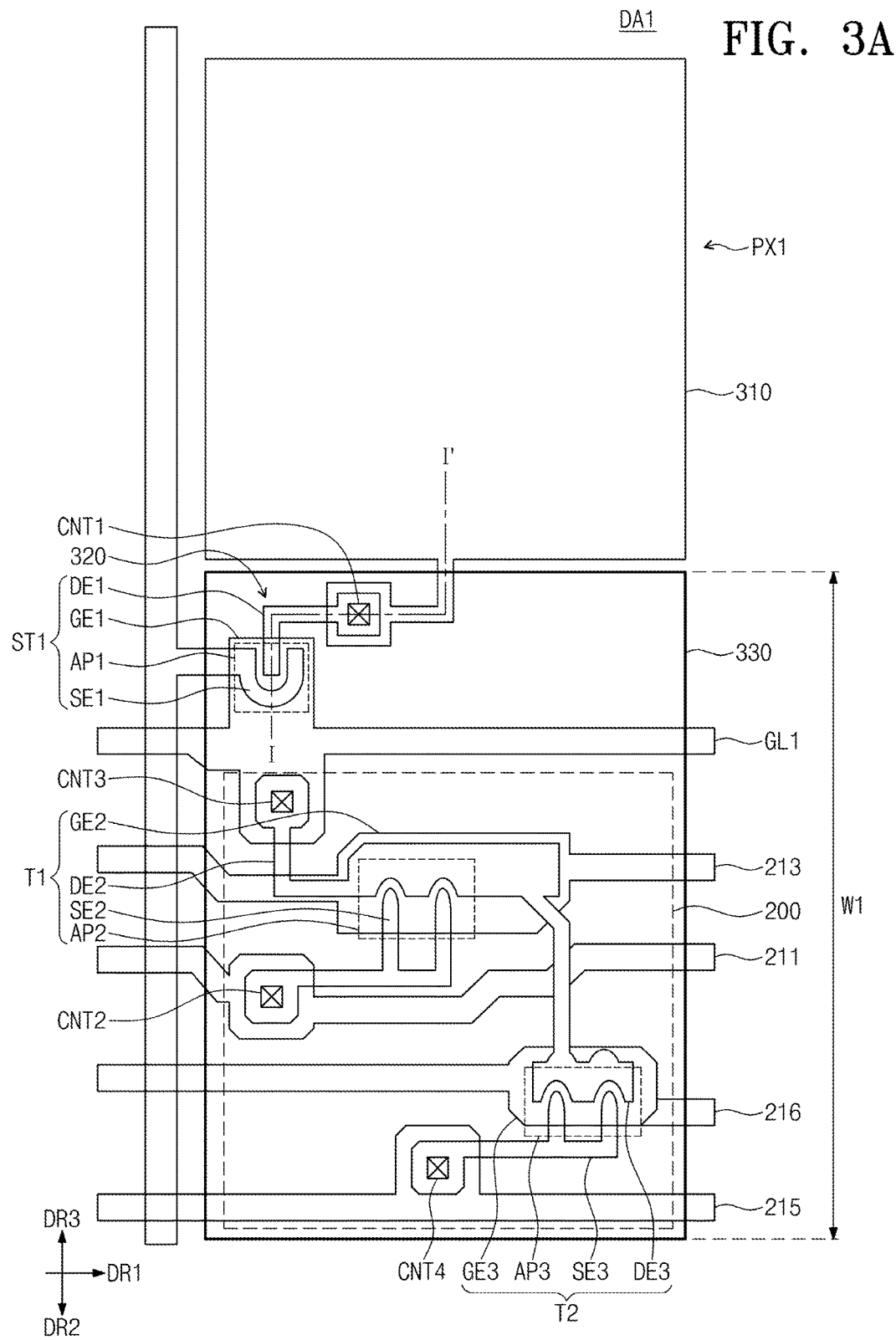
FIG. 3A is a layout of the pixel shown in FIG. 2A.
Figure 3B:
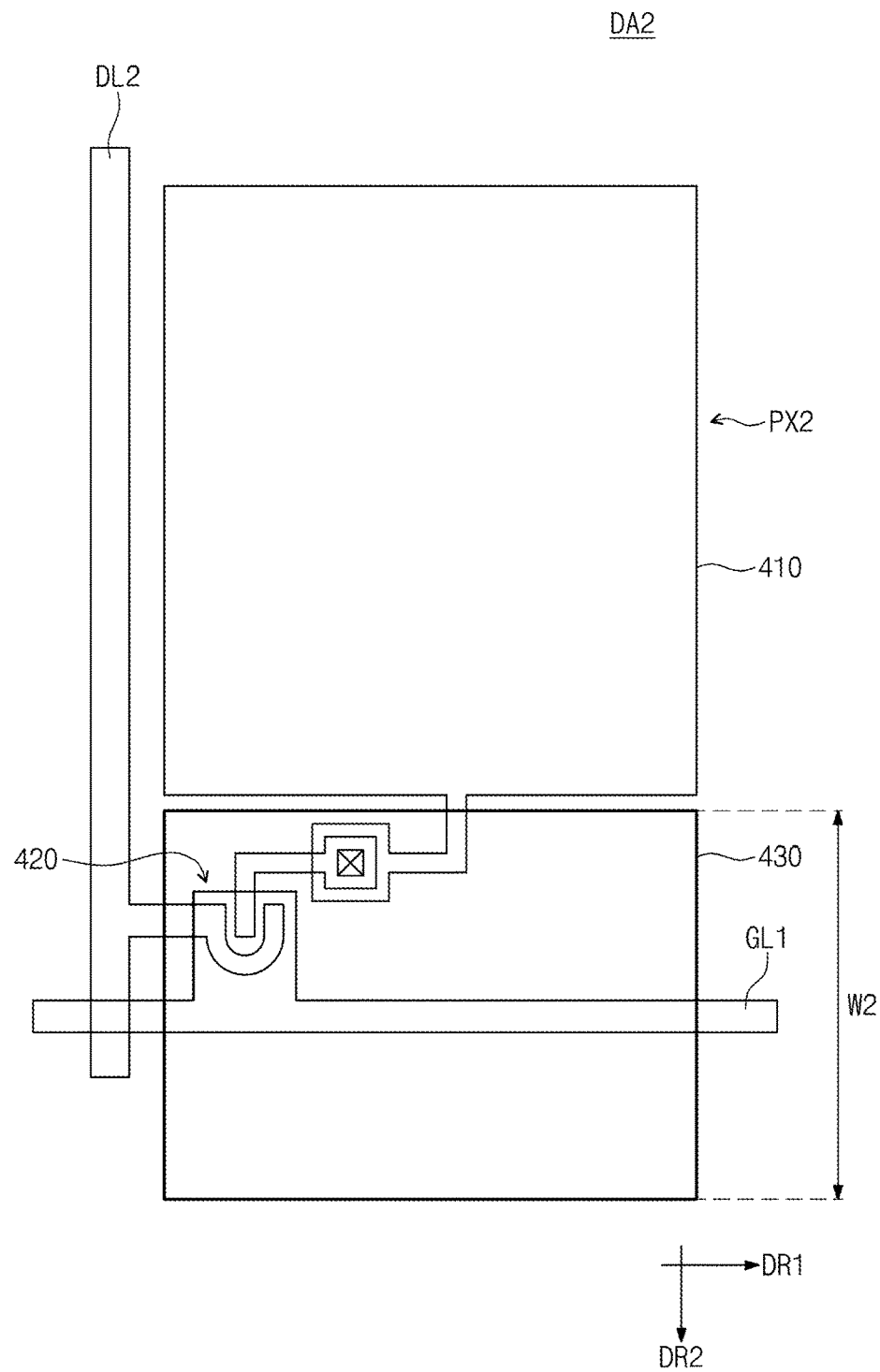
FIG. 3B is a layout of the pixel shown in FIG. 2B.
Figure 3C:
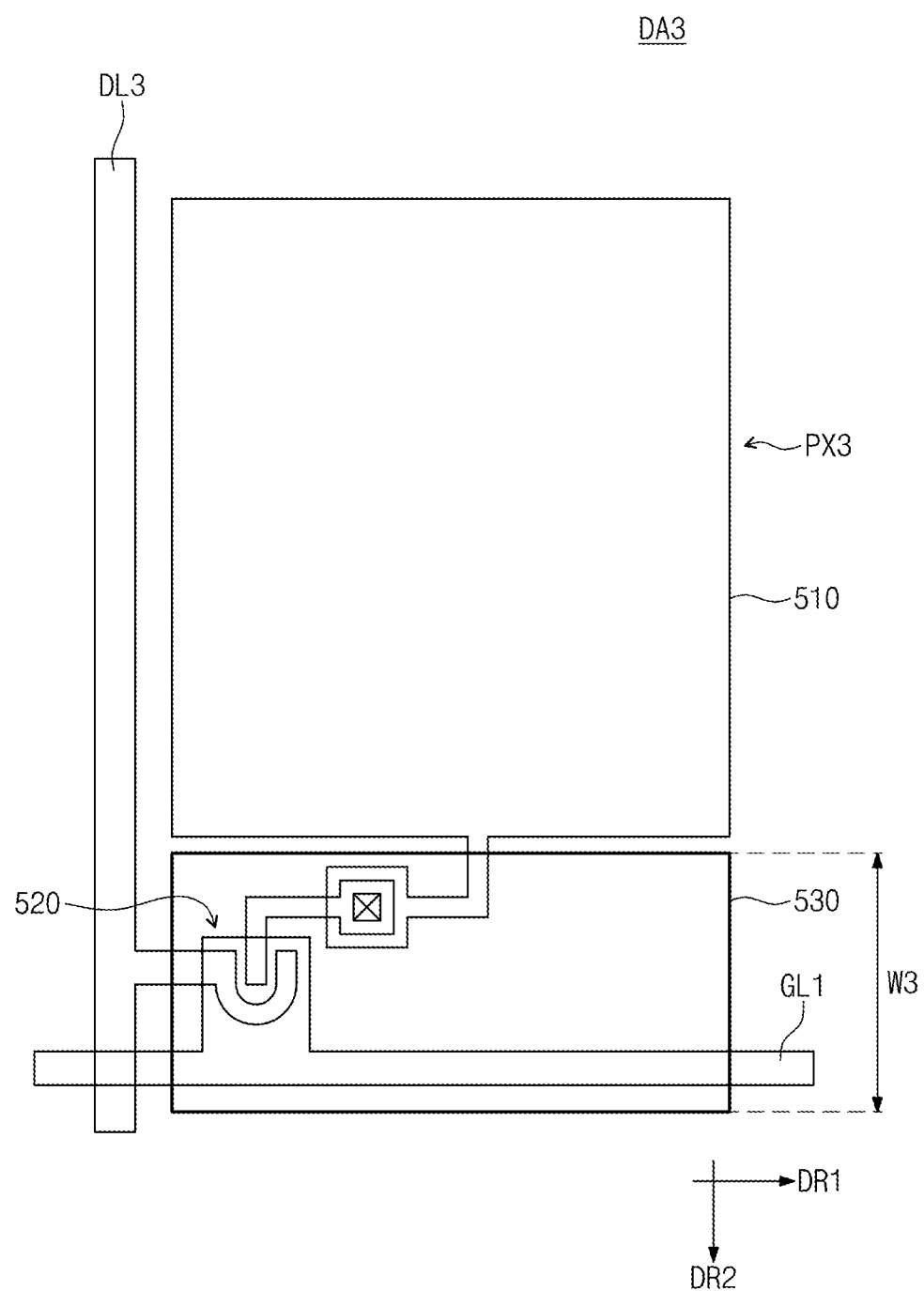
FIG. 3C is a layout of the pixel shown in FIG. 2C.
Figure 4:
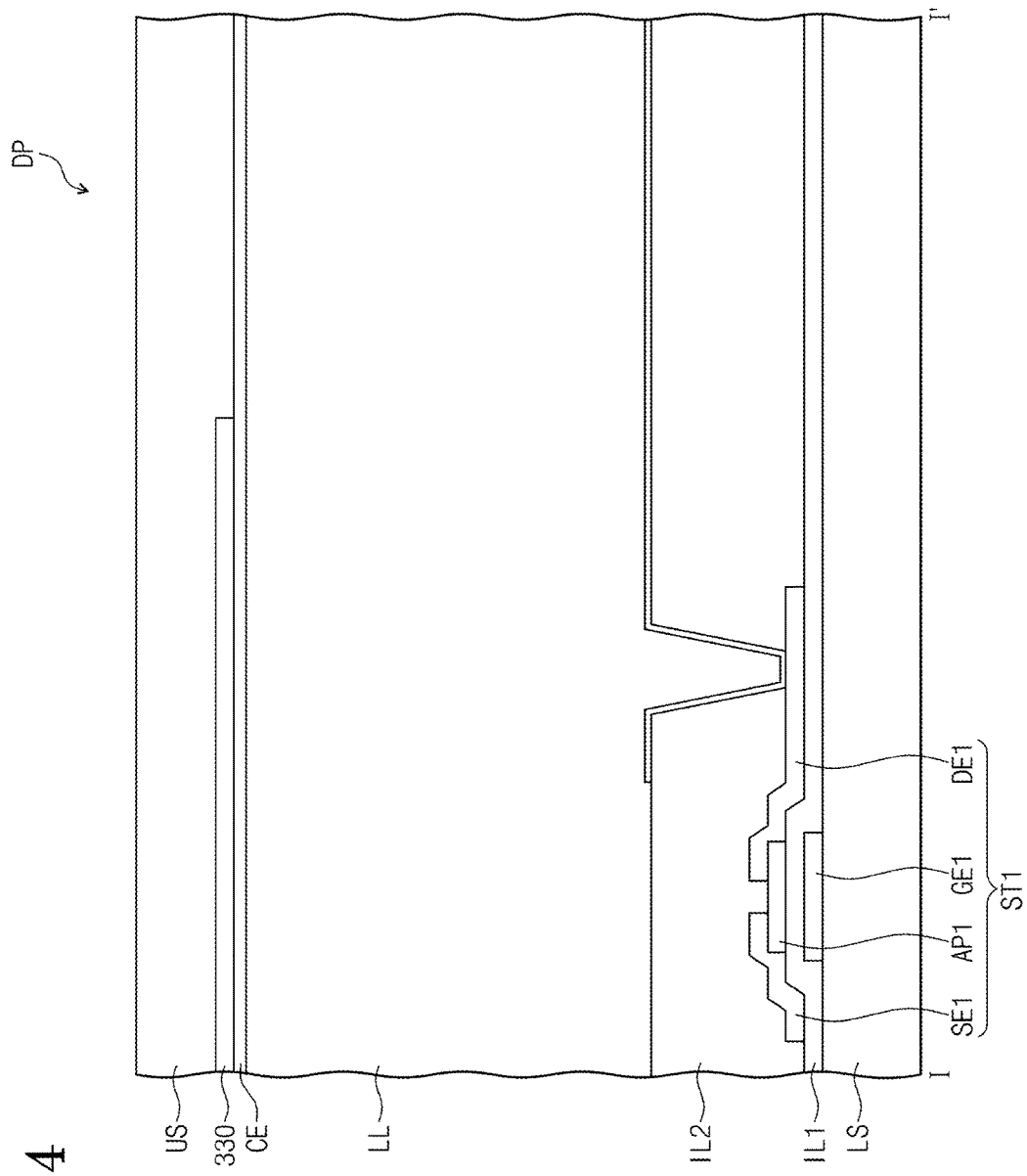
FIG. 4 is a cross-sectional view taken along a line I-I' of FIG. 3A.

FIG. 3A is a layout of the pixel shown in FIG. 2A, FIG. 3B is a layout of the pixel shown in FIG. 2B, FIG. 3C is a layout of the pixel shown in FIG. 2C, and FIG. 4 is a cross-sectional view taken along a line I-I' of FIG. 3A.

Referring to FIGS. 3A and 4, the first pixel PX1 includes the first pixel electrode 310, the first pixel circuit 320, and the first light blocking part 330.

The first switching transistor ST1 includes a first gate electrode GE1, a first active pattern AP1, a first source electrode SE1, and a first drain electrode DE1. In the following description, the gate electrode, the source electrode, and the drain electrode of the transistor may be respectively referred to as the control terminal, the input terminal, and the output terminal.

The first gate electrode GE1 is branched from the first gate line GL1, and the first active pattern AP1 is disposed above the first gate electrode GE1 such that a first insulating layer IL1 is disposed between the first active pattern AP1 and the first gate electrode GE1. The first source electrode SE1 is branched to make contact with the first active pattern AP1, and the first drain electrode DE1 is spaced apart from the first source electrode SE1 to make contact with the first active pattern AP1.

A second insulating layer IL2 covers the first switching transistor ST1. The first pixel electrode 310 is disposed on the second insulating layer IL2, and the first pixel electrode 310 makes contact with the first drain electrode DE1 through a first contact hole CNT1 defined through the second insulating layer IL2.

The lines 211, 213, 215, and 216 extend in the first direction DR1 and are arranged in the second direction DR2 to be spaced apart from each other by a predetermined distance.

The first transistor T1 includes a second gate electrode GE2, a second active pattern AP2, a second source electrode SE2, and a second drain electrode DE2.

The second gate electrode GE2 is branched from the on-switching line 213, and the second active pattern AP2 is disposed above the second gate electrode GE2 such that the first insulating layer IL1 is disposed between the second active pattern AP2 and the second gate electrode GE2.

One end of the second source electrode SE2 makes contact with the second active pattern AP2, and the other end of the second source electrode SE2 makes contact with the clock line 211 through a second contact hole CNT2 defined through the first insulating layer IL1. The one end of the second source electrode SE2 may include two first branch portions extending in a third direction DR3 opposite to the second direction DR2.

One end of the second drain electrode DE2 is spaced apart from the second source electrode SE2 and makes contact with the second active pattern AP2, and the other end of the second drain electrode DE2 is connected to the first gate line GL1 through a third contact hole CNT3 defined through the first insulating layer IL1. The second drain electrode DE2 includes two first recesses.

The first recesses are recessed toward the third direction DR3. The two branch portions are respectively inserted into the two first recesses. Accordingly, the two first branch portions are overlapped with the two recesses in the first direction DR1. The number of the first branch portions and the number of the first recesses may be determined depending on the driving characteristic of the first transistor T1. For instance, three or more first branch portions and first recesses may be applied to the pixel to improve the driving characteristic, i.e., a driving capacity, or to increase a W/L ratio of a channel width of the first transistor T1 to a channel length of the first transistor T1.

The second transistor T2 includes a third gate electrode GE3, a third active pattern AP3, a third source electrode SE3, and a third drain electrode DE3.

The third gate electrode GE3 is branched from the off-switching line 216, and the third active pattern AP3 is disposed above the third gate electrode GE3 such that the first insulating layer IL1 is disposed between the third active pattern AP3 and the third gate electrode GE3.

One end of the third source electrode SE3 makes contact with the third active pattern AP3, and the other end of the third source electrode SE3 makes contact with the low voltage line 215 through a fourth contact hole CNT4 defined through the first insulating layer IL1. The one end of the third source electrode SE3 may include two second branch portions extending in the third direction DR3.

One end of the third drain electrode DE3 is spaced apart from the third source electrode SE3 and makes contact with the third active pattern AP3, and the other end of the third drain electrode DE3 is branched from the second drain electrode DE2. The third drain electrode DE3 includes two second recesses. The second branch portions and the second recesses have the similar structure and function as those of the first branch portions and the first recesses, and thus details thereof are omitted.

The first light blocking part 330 prevents the first switching transistor ST1, the second gate circuit 200, and the first gate line GL1 from being visible. The first light blocking part 330 is overlapped with the first switching transistor ST1, the second gate circuit 200, and the first gate line GL1 when viewed in a plan view.

In the present exemplary embodiment, the first light blocking part 330 has a substantially quadrangular shape and has the same width as the first pixel electrode 310 in the first direction DR1. The first light blocking part 330 has a first width W1 in the second direction DR2.

In the present disclosure, a transmittance of the display panel DP at an arbitrarily selected area or portion may be defined by a ratio of an area covered by a light blocking part, e.g., the first light blocking part 330, to an area not covered by first light blocking part 330.

The first light blocking part 330 is interposed between an upper base substrate US of the display panel DP and a common electrode CE and includes a black matrix containing a light absorbing material. However, the first light blocking part 330 is not limited thereto or thereby, and the first light blocking part 330 may have various shapes. That is, the first light blocking part may include a black matrix disposed between a lower base substrate LS of the display panel DP and a liquid crystal LL. In addition, the first light blocking part 330 may include a metal material having high reflectance or may have a color filter stack structure in which color filters transmitting different colors are stacked. The color filter may be stacked in a structure in which two color filters among a red color filter, a green color filter, and a blue color filter are stacked.

Referring to FIG. 3B, the second pixel PX2 includes the second pixel electrode 410, the second pixel circuit 420, and the second light blocking part 430.

The second pixel circuit 420 and the second pixel electrode 410 are respectively similar to the first pixel circuit 320 and the first pixel electrode 310, and thus details thereof are omitted.

In the present exemplary embodiment, the second light blocking part 430 prevents the second pixel circuit 420 and the first gate line GL1 from being visible. The second light blocking part 430 is overlapped with the second pixel circuit 420 and the first gate line GL1 when viewed in a plan view.

In the present exemplary embodiment, the second light blocking part 430 has a substantially quadrangular shape and has the same width in the first direction DR1 as the second pixel electrode 410. The second light blocking part 430 has a second width W2 in the second direction DR2.

In the present exemplary embodiment, the second light blocking part 430 may include the same material as that of the first light blocking part 330.

Referring to FIG. 3C, the third pixel PX3 includes the third pixel electrode 510, the third pixel circuit 520, and the third light blocking part 530.

The third pixel circuit 520 and the third pixel electrode 510 are respectively similar to the first pixel circuit 320 and the first pixel electrode 310, and thus details thereof are omitted.

The third light blocking part 530 prevents the third pixel circuit 520 and the first gate line GL1 from being visible.

The third light blocking part 530 is overlapped with the third pixel circuit 520 and the first gate line GL1 when viewed in a plan view.

In the present exemplary embodiment, the third light blocking part 530 has a substantially quadrangular shape and has the same width in the first direction DR1 as the third pixel electrode 510. The third light blocking part 530 has a third width W3 in the second direction DR2.

In the present exemplary embodiment, the third light blocking part 530 may include the same material as that of the first light blocking part 330.

Referring to FIGS. 3A to 3C, the first, second, and third light blocking parts 330, 430, and 530 have different areas from each other. In more detail, the first, second, and third widths W1, W2, and W3 satisfy the following condition of W1>W2>W3. Accordingly, the areas of the first, second, and third light blocking parts 330, 430, and 530, respectively referred to as A1, A2, and A3, satisfy the following condition of A1>A2>A3. In addition, the areas of the first, second, and third pixel electrodes 310, 410, and 510, respectively referred to as S1, S2, and S3, satisfy the following condition of S1<S2<S3.

Consequently, a first transmittance of the first display part DA1 in which the first pixel PX1 is disposed is lowest, a third transmittance of the third display part DA3 in which the third pixel PX3 is disposed is highest, and a second transmittance of the second display part DA2 in which the second pixel PX2 is disposed has a value between the first and third transmittances.

That is, since the second gate circuit 200 is disposed in the first display part DA1, a large difference exists between the first and third transmittances. However, when the second display part DA2 having the second transmittance is interposed between the first and third display parts DA1 and DA3, a boundary between the first and third display parts DA1 and DA3 may be prevented from being recognized even though the difference in transmittance exists between the first and third display parts DA1 and DA3. That is, the second display part makes the visual transition between the first and third transmittances less abrupt and less recognizable by a viewer of the display apparatus. As a result, a display quality of the display apparatus 1000 (refer to FIG. 1) may be improved.

Figure 5:
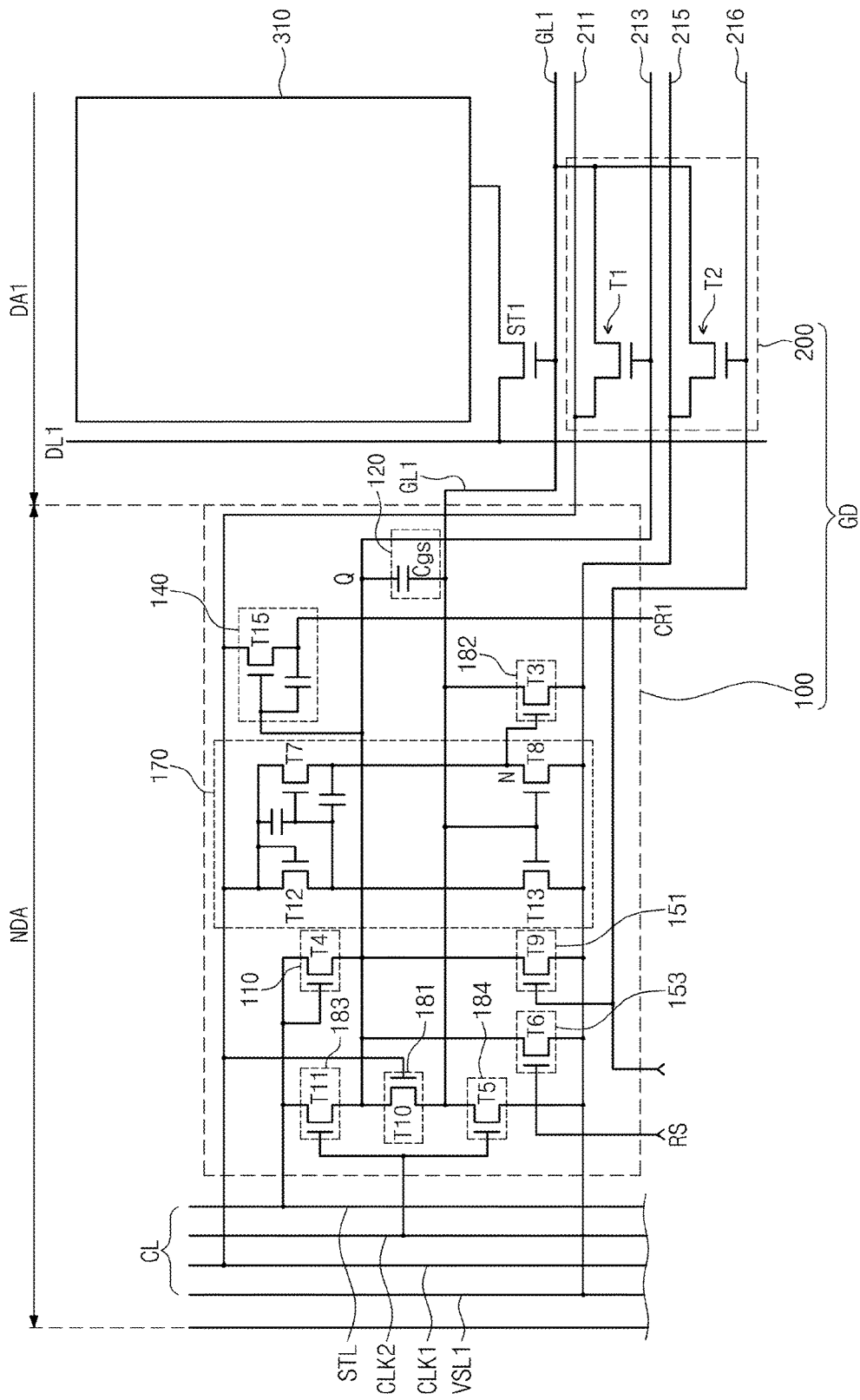
FIG. 5 is a circuit diagram showing a first stage shown in FIG. 1.

FIG. 5 is a circuit diagram showing a first stage shown in FIG. 1.

Referring to FIGS. 1 and 5, a control line CL and the first gate circuit 100 of the first stage SG1 are disposed in the non-display part NDA, and the second gate circuit 200 is disposed in the first display part DA1.

The control line CL includes a first voltage line VSL1, a first clock line CLK1, a second clock line CLK2, and a vertical start line STL, which are provided to the first stage SG1. Although not shown in figures, the control line CL may further include a third clock line and a fourth clock line. The first voltage line VSL1 transmits the low voltage, the first clock line CLK1 transmits the first clock signal, the second clock line CLK2 transmits the second clock signal, and the vertical start line STL transmits the vertical start signal.

In the present exemplary embodiment, the first gate circuit 100 includes a buffer part 110, a charge part 120, a carry part 140, a first discharge part 151, a second discharge part 153, a switch part 170, a first maintain part 181, a second maintain part 182, a third maintain part 183, and a fourth maintain part 184.

The buffer part 110 includes a fourth transistor T4. A control terminal and an input terminal of the buffer part 110 are connected to the vertical start line STL to receive the vertical start signal, and an output terminal of the buffer part 110 is connected to the Q-node Q (or control node). Responsive to the high voltage of the vertical start signal, the buffer part 110 allows the charge part 120 connected to the Q-node Q to be charged with the high voltage of the vertical start signal.

The charge part 120 includes a boost capacitor Cgs. The boost capacitor Cgs includes a first terminal connected to the Q-node Q and a second terminal connected to the first gate line GL1.

The control terminal of the first transistor T1 is electrically connected to the first terminal of the charge part 120 connected to the Q-node Q through the on-switching line 213, the input terminal of the first transistor T1 receives the first clock signal through the clock line 211 connected to the first clock line CLK1, and the output terminal is connected to the first gate line GL1. When the first clock signal is received while the high voltage charged in the boost capacitor Cgs is applied to the control terminal of the first transistor T1, the first transistor T1 is bootstrapped. In this case, the boost capacitor Cgs boosts the voltage charged therein. The first transistor T1 applies the high voltage of the first clock signal to the first gate line GL1 in response to the boosted voltage.

The carry part 140 includes a fifteenth transistor T15. A control terminal of the carry part 140 is connected to the Q-node Q, an input terminal of the carry part 140 receives the first clock signal, and an output terminal of the carry part 140 is connected to one stage among the next stages following the carry part 140. When the high voltage is applied to the Q-node Q, the carry part 140 applies the high voltage of the first clock signal to the second stage SG2 as a first carry signal CR1.

The discharge part 151 includes a ninth transistor T9. A control terminal of the discharge part 151 is connected to the off-switching line 216 and receives therefrom a second gate signal of the second gate line GL2 from the second stage SG2 (refer to FIG. 1) corresponding to one of the next stages, an input terminal of the discharge part 151 is connected to the Q-node Q, and an output terminal of the discharge part 151 is connected to the first voltage line VSL1. The first discharge part 151 discharges the voltage applied to the Q-node Q to the low voltage in response to the high voltage of the second gate signal output from the second stage SG2.

The control terminal of the second transistor T2 is connected to the second stage SG2 through the off-switching line 216, the output terminal of the second transistor T2 is connected to the first gate line GL1, and the input terminal of the second transistor T2 is connected to the first voltage line VSL1 through the low voltage line 215. The second transistor T2 discharges the voltage applied to the first gate line GL1 to the low voltage.

The second discharge part 153 includes a sixth transistor T6. A control terminal of the second discharge part 153 receives a reset signal RS, an input terminal of the second discharge part 153 is connected to the Q-node Q, and an output terminal of the second discharge part 153 is connected to the first voltage line VSL1. The second discharge part 153 discharges the voltage applied to the Q-node Q to the low voltage in response to the high voltage of the reset signal RS output from the n-th stage SGn corresponding to a final stage of the gate driver GD (refer to FIG. 1).

The switch part 170 includes a twelfth transistor T12, a seventh transistor T7, a thirteenth transistor T13, and an eighth transistor T8. When the high voltage is applied to the first gate line GL1, the eighth and thirteenth transistors T8 and T13 are turned on, and a voltage applied to an N-node N is discharged to the low voltage. When the low voltage is applied to the first gate line GL1, the eighth and thirteenth transistors T8 and T13 are turned off, and thus a signal synchronized with the first clock signal is applied to the N-node N.

The first maintain part 181 includes a tenth transistor T10. A control terminal of the first maintain part 181 receives the first clock signal from the first clock line CK1, an input terminal of the first maintain part 181 is connected to the Q-node Q, and an output terminal of the first maintain part 181 is connected to the first gate line GL1. The first maintain part 181 maintains the voltage of the Q-node Q to the voltage of the first gate line GL1 in response to the high voltage of the first clock signal.

The second maintain part 182 includes a third transistor T3. A control terminal of the second maintain part 182 is connected to the N-node N, an input terminal of the second maintain part 182 is connected to the first gate line GL1, and an output terminal of the second maintain part 182 is connected to the first voltage line VSL1.

The second maintain part 182 maintains the voltage of the first gate line GL1 to the low voltage in response to the high voltage applied to the N-node N. The third maintain part 183 includes an eleventh transistor T11. A control terminal of the third maintain part 183 is connected to the second clock line CLK2 to receive the second clock signal, an input terminal of the third maintain part 183 receives the vertical start signal, and an output terminal of the third maintain part 183 is connected to the Q-node Q. The third maintain part 183 maintains the voltage of the Q-node Q to the voltage level of the vertical start signal in response to the high voltage of the second clock signal. The fourth maintain part 184 includes a fifth transistor T5. A control terminal of the fourth maintain part 184 receives the second clock signal, an input terminal of the fourth maintain part 184 is connected to the first gate line GL1, and an output terminal of the fourth maintain part 184 is connected to the first voltage line VSL1. The fourth maintain part 184 maintains the voltage of the first gate line GL1 to the low voltage in response to the high voltage of the second clock signal.

According to the above-mentioned description, the first and second transistors T1 and T2 are disposed in the first display part DA1 as components of the second gate circuit 200, but the present disclosure is not thereto or thereby.

Figure 6:
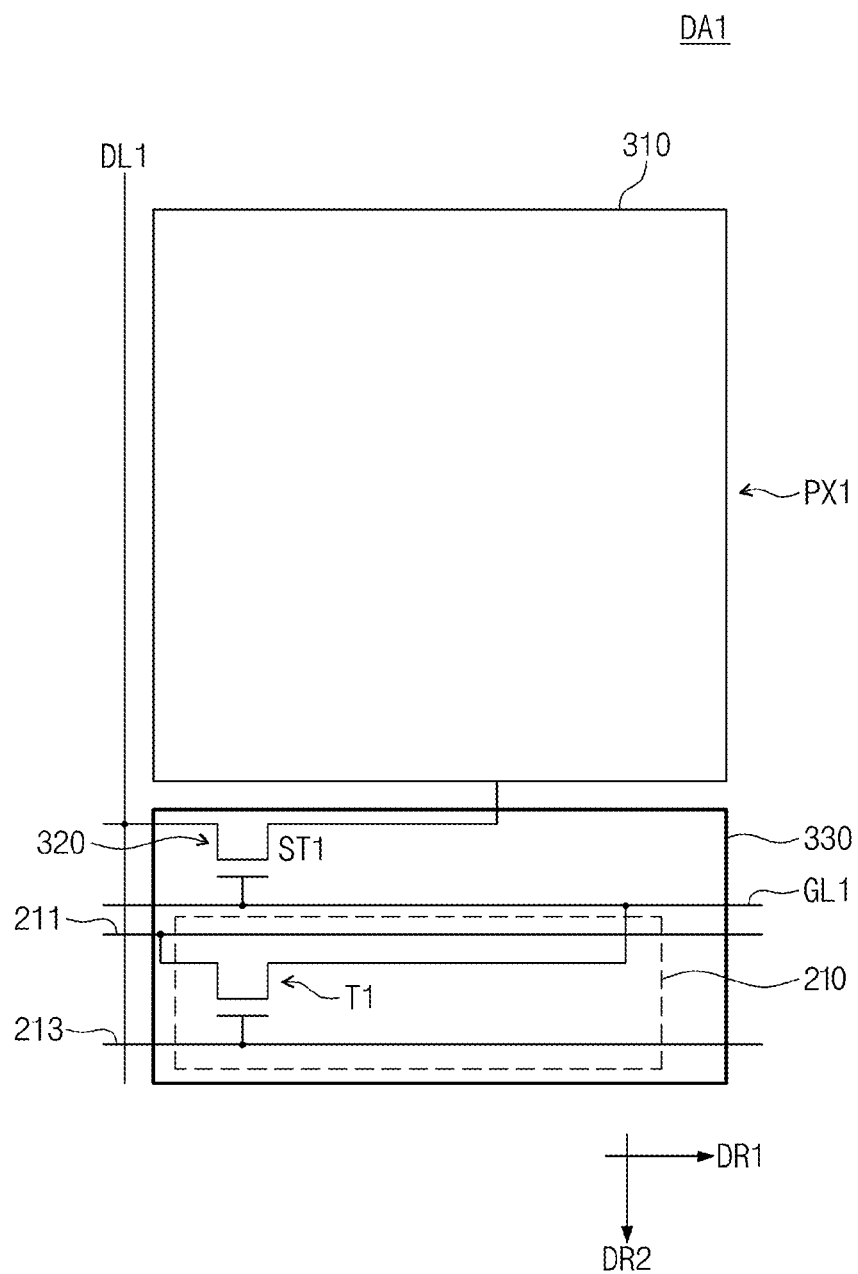
FIG. 6 is a view showing a first pixel according to an exemplary embodiment of the present disclosure.

FIG. 6 is a view showing a first pixel according to an exemplary embodiment of the present disclosure. As shown in FIG. 6, a second gate circuit 210 according to the present exemplary embodiment includes only the first transistor T1, and the second transistor T2 (refer to FIG. 5) is disposed in the non-display part NDA (refer to FIG. 5) other than the first display part DA1 as a component of the first gate circuit 100. Alternatively, although not shown in FIG. 6, the second gate circuit 210 may include only the second transistor T2 or may further include at least one of the buffer part 110, the charge part 120, the carry part 140, the first discharge part 151, the second discharge part 153, the switch part 170, the first maintain part 181, the second maintain part 182, the third maintain part 183, and the fourth maintain part 184.

Figure 7:
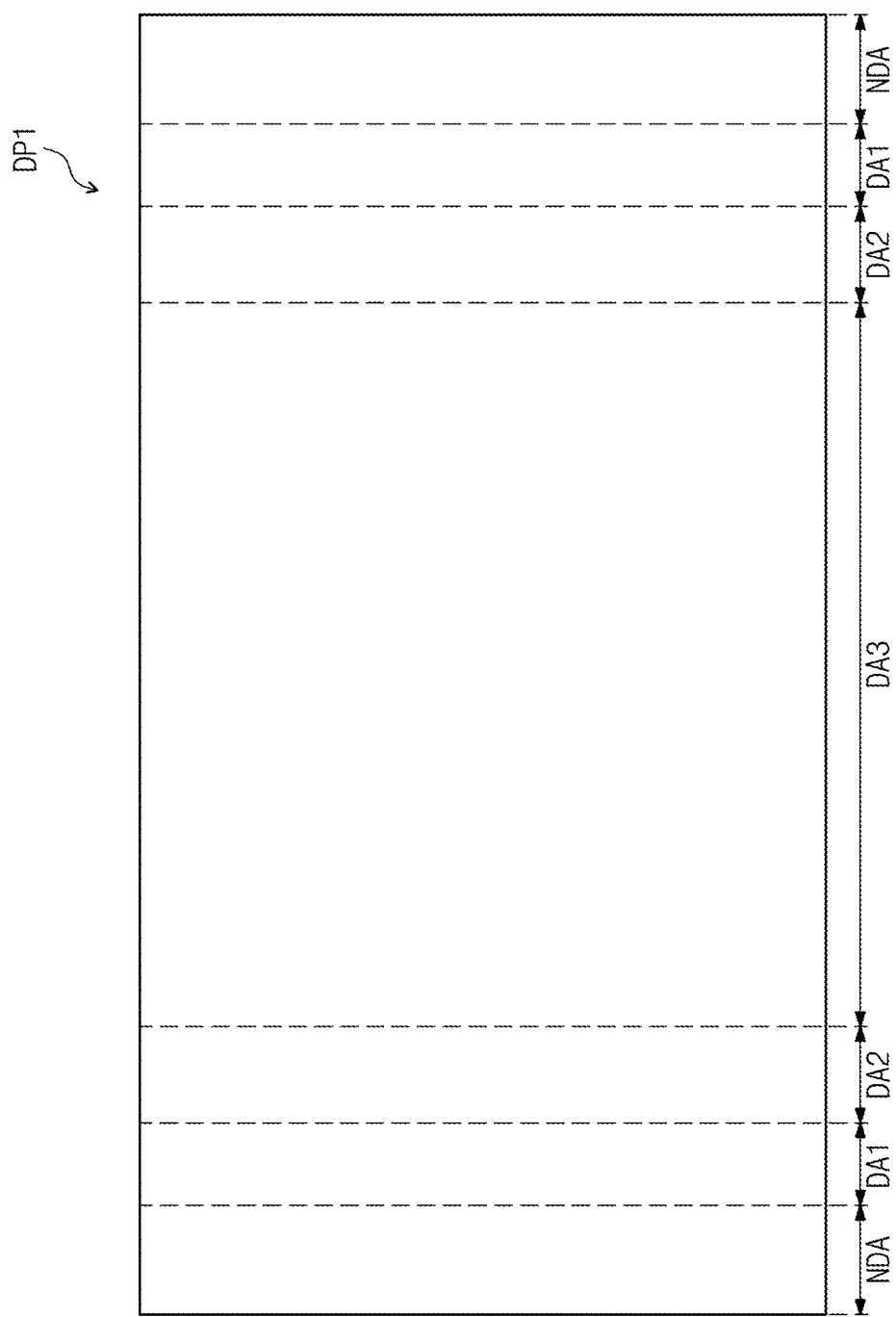
FIG. 7 is a view showing a display panel according to an exemplary embodiment of the present disclosure.

FIG. 7 is a view showing a display panel DP1 according to an exemplary embodiment of the present disclosure. FIG. 7 shows only high-level representations of the first, second, and third display parts DA1 to DA3, and configuration details (e.g., the first and second circuits 100 and 200 shown in FIG. 1) of the first to third display parts DA1 to DA3 are omitted.

In the present exemplary embodiment, each of the first and second display parts DA1 and DA2 of the display panel DP1 is provided in a plural number. The first, second, and third display parts DA1 to DA3 are arranged in the display panel DP1 in order of the first display part DA1, the second display part DA2, the third display part DA3, the second display part DA2, and the first display part DA1.

In the above-mentioned structure, the gate driver GD (refer to FIG. 1) is disposed in the non-display part NDA and the first display part DA1, which are defined at opposite sides of the third display part DA3, and thus the display panel DP1 may be stably operated. In particular, although the third display part DA3 has a large area, a difference in brightness between the areas at opposite sides of the third display part DA3 may be prevented from occurring, and the display panel DP1 may be more stably operated.

Figure 8:
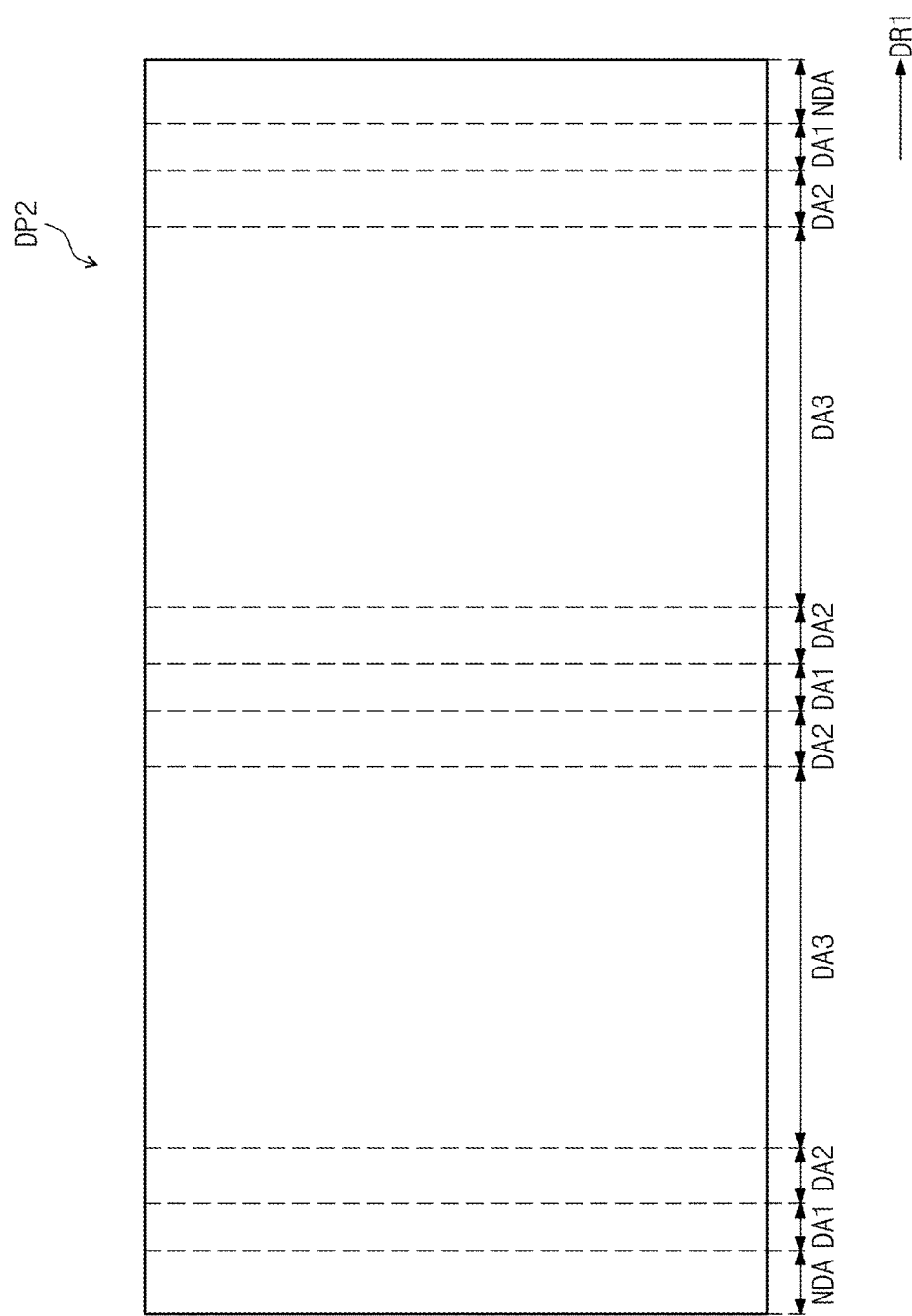
FIG. 8 is a view showing a display panel according to an exemplary embodiment of the present disclosure.

The first to third display parts DA1 to DA3 are not limited thereto or thereby. FIG. 8 is a view showing a display panel DP2 according to an exemplary embodiment of the present disclosure. FIG. 8 shows only high-level representations of the first, second, and third display parts DA1 to DA3, and configuration details (e.g., the first and second circuits 100 and 200 shown in FIG. 1) of the first to third display parts DA1 to DA3 are omitted.

Different from the display panel DP1 shown in FIG. 7, the third display part DA3 of the display panel DP2 shown in FIG. 8 may be provided in a plural number. The third display parts DA3 are arranged to be spaced apart from each other in the first direction DR1. The display panel DP2 includes the first, second, and third display parts DA1, DA2, and DA3 arranged in the first direction DR1 in order of the first display part DA1, the second display part DA2, the third display part DA3, the second display part DA2, the first display part DA1, the second display part DA2, the third display part DA3, the second display part DA2, and the first display part DA1.

Accordingly, although the third display part DA3 has a large area, a difference in brightness between the areas at opposite sides of the third display part DA3 may be prevented from occurring, and the display panel DP1 may be more stably operated.

Figure 9:
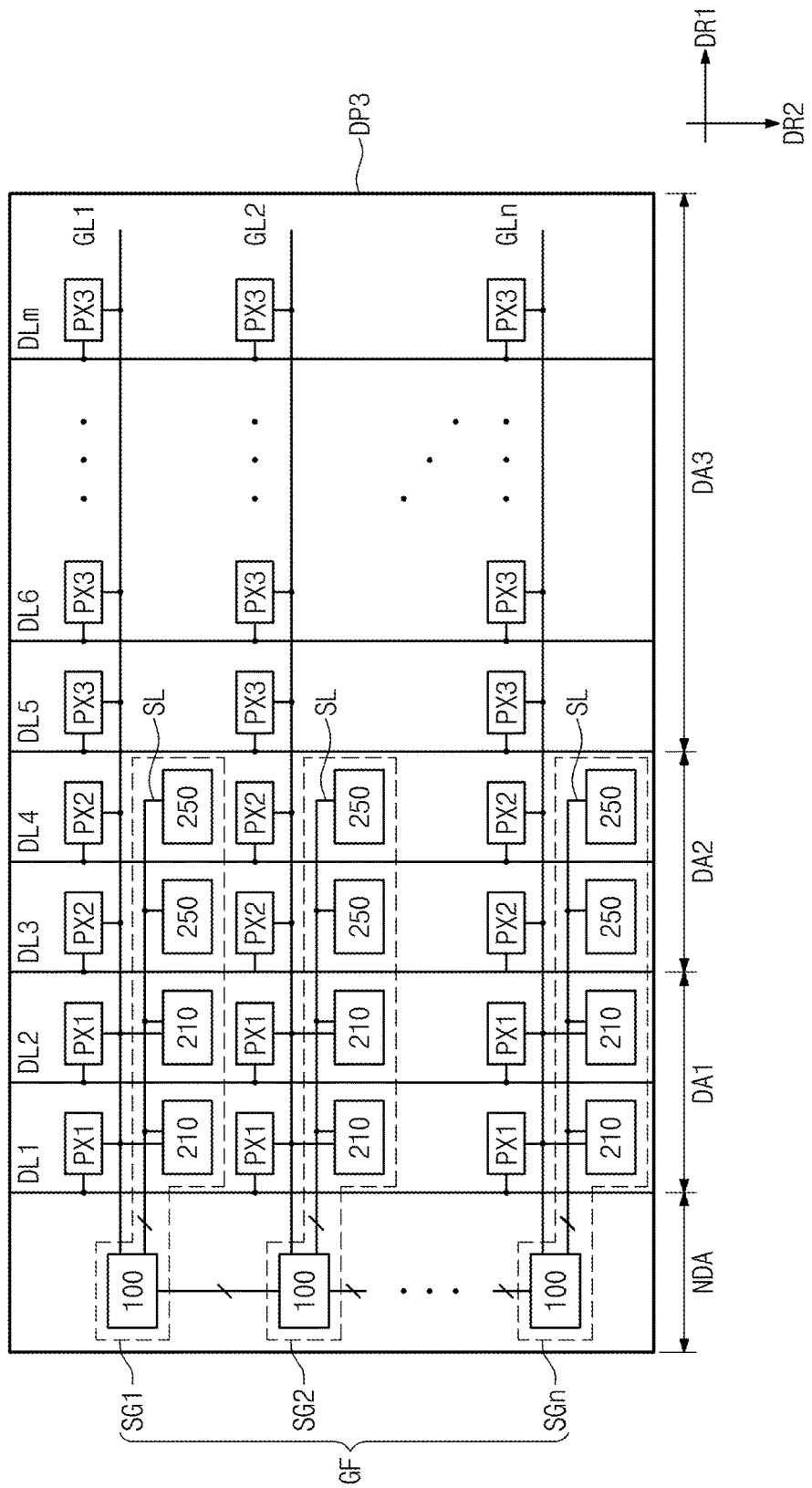
FIG. 9 is a view showing a display panel according to an exemplary embodiment of the present disclosure.

FIG. 9 is a view showing a display panel DP3 according to an exemplary embodiment of the present disclosure.

Referring to FIG. 9, the display panel DP3 includes a gate driver GF implemented by an in-pixel gate driver. The gate driver GF has the same structure and function as those of the gate driver GD shown in FIG. 1 except that the gate driver GF further includes third gate circuits 250, and thus repetitive explanations are omitted.

In addition, a different reference number has been assigned to the second gate circuits 210 shown in FIG. 9 so as to distinguish the second gate circuits 210 from the second gate circuits 200 shown in FIG. 1. The second gate circuits 210 are connected to corresponding third gate circuits 250 through the signal line SL.

The second gate circuits 210 are arranged in a matrix form to correspond to the first pixels PX1. In more detail, an i-th second gate circuit in the first direction DR1 among the second gate circuits 210 is disposed between an i-th data line and an (i+1)-th data line among the data lines DL1 to DLm.

The third gate circuits 250 are arranged in a matrix form to correspond to the second pixels PX2. In more detail, a third gate circuit in the first direction DR1 among the third gate circuits 250 is disposed between a j-th data line and a (j+1)-th data line among the data lines DL1 to DLm. The number "j" is an integer greater than the number "i".

Among the third gate circuits 250, a k-th third gate circuit in the second direction DR2 is disposed between a k-th gate line and a (k+1)-th gate line among the gate lines GL1 to GLn.

In the present exemplary embodiment, among the first to n-th stages SG1 to SGn, a k-th stage is configured to include the first, second, and third gate circuits 100, 210, and 250 arranged in a k-th row. The first, second, and third gate circuits 100, 210, and 250 arranged in the k-th row are connected to each other by the signal line SL.

In the present exemplary embodiment, each of the first to n-th stages SG1 to SGn includes two third gate circuits 250, but the number of the third gate circuits 250 in each of the first to n-th stages SG1 to SGn is not limited to two. That is, each of the first to n-th stages SG1 to SGn may include q or more third gate circuits 250. The number "q" is determined depending on characteristics of each of the gate lines GL1 to GLn.

Since several configurations of the gate driver GF are spatially distributed in the first and second display parts DA1 and DA2 as the third gate circuit 250, the width of the non-display part NDA (or bezel) is effectively reduced, and the transmittance of the first display part DA1 is improved.

Figure 10A:
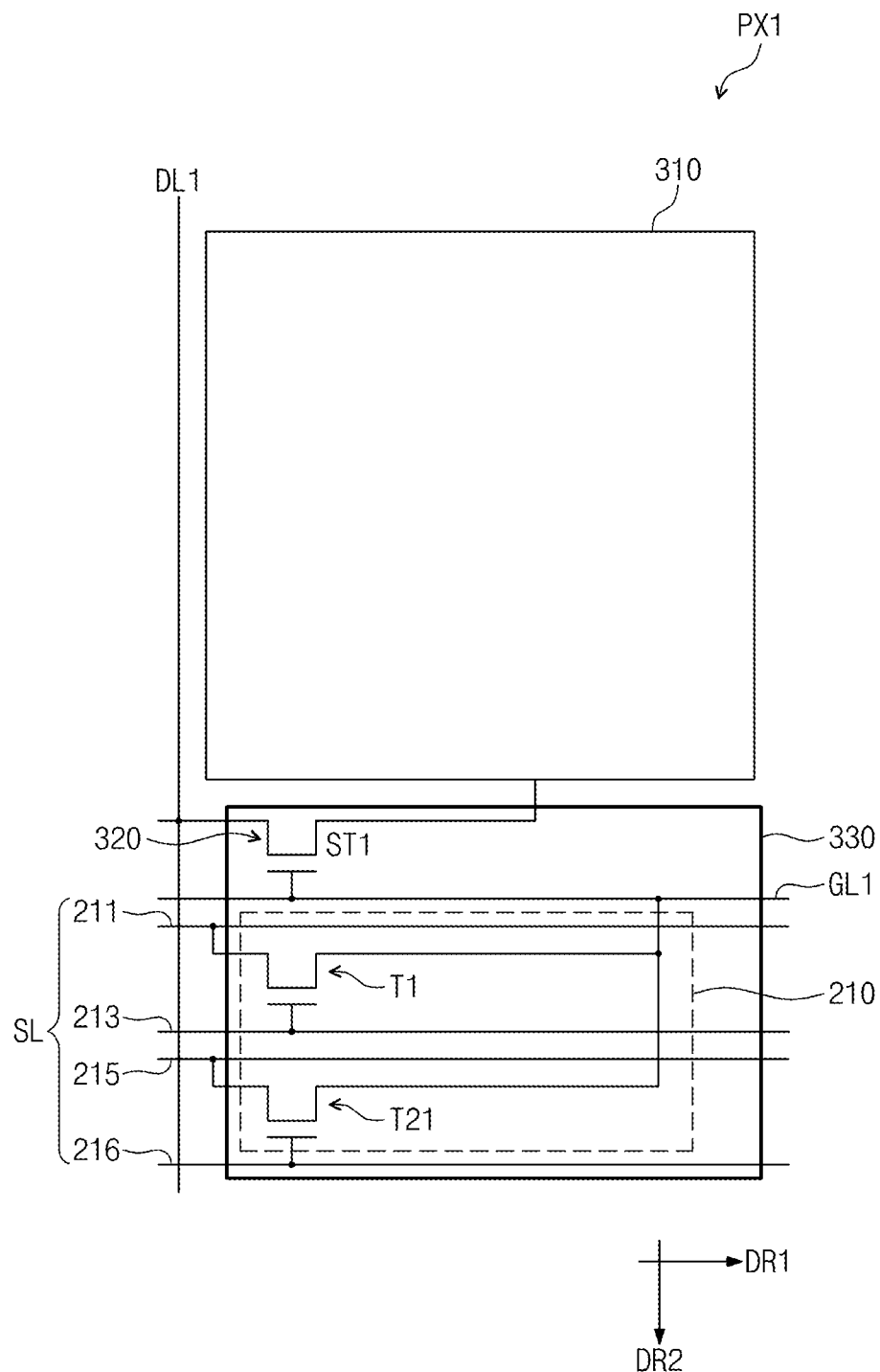
FIG. 10A is a view showing a first pixel shown in FIG. 9 according to an exemplary embodiment of the present disclosure.
Figure 10B:
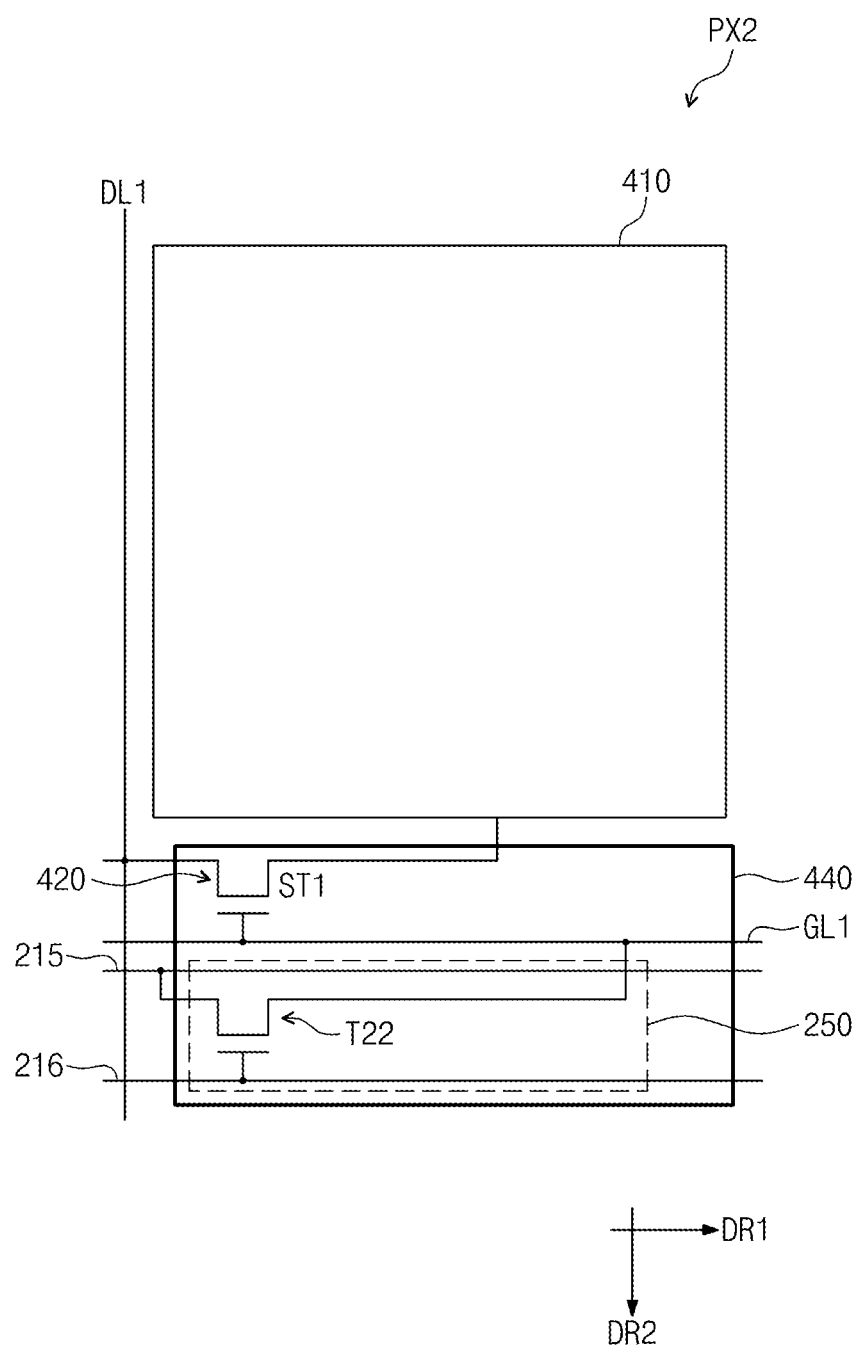
FIG. 10B is a view showing a second pixel shown in FIG. 9 according to an exemplary embodiment of the present disclosure.
Figure 10C:
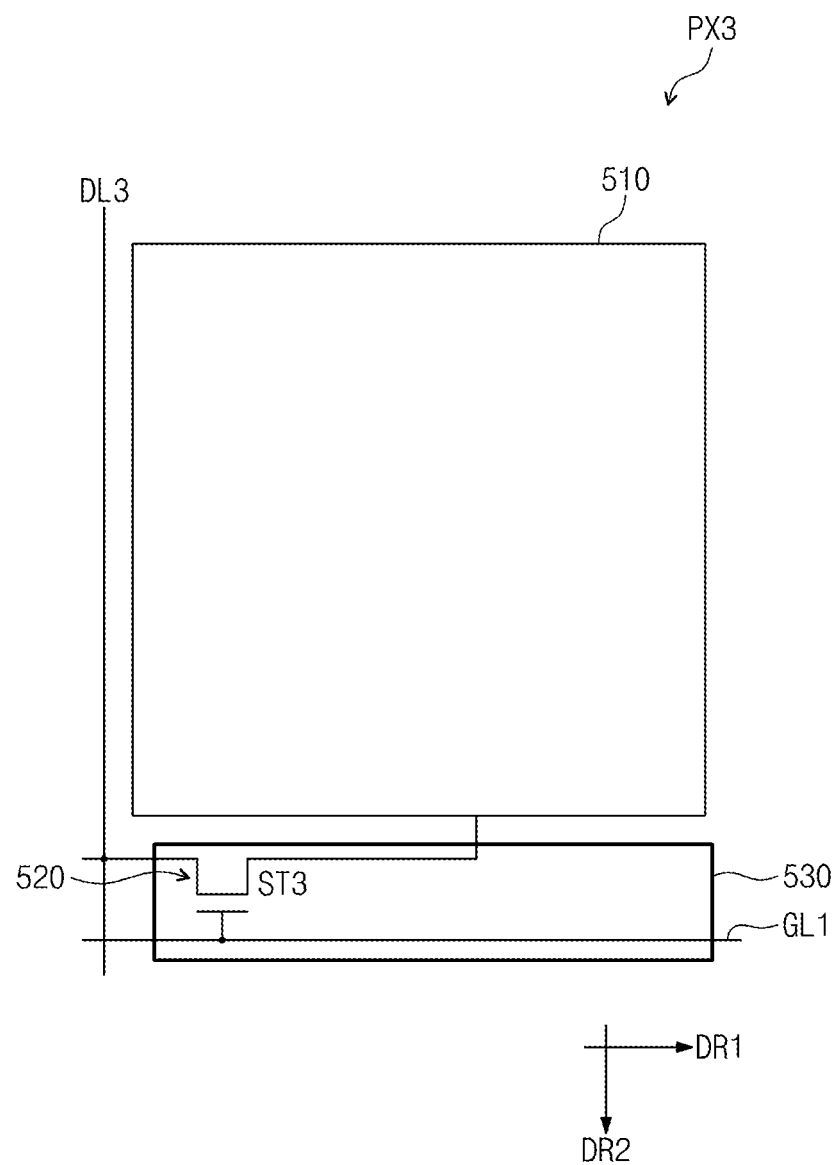
FIG. 10C is a view showing a third pixel shown in FIG. 9 according to an exemplary embodiment of the present disclosure.

FIG. 10A is a view showing the first pixel PX1 shown in FIG. 9 according to an exemplary embodiment of the present disclosure, FIG. 10B is a view showing the second pixel PX2 shown in FIG. 9 according to an exemplary embodiment of the present disclosure, and FIG. 10C is a view showing the third pixel PX3 shown in FIG. 9 according to an exemplary embodiment of the present disclosure.

The first and third pixels PX1 and PX3 shown in FIGS. 10A and 10C are substantially the same as the first and third pixels PX1 and PX3 shown in FIGS. 2A and 2C, and thus details thereof are omitted.

Referring to FIG. 10B, the second pixel PX2 includes the second pixel electrode 410, the second pixel circuit 420, and a second light blocking part 440.

The third gate circuit 250 is disposed spaced apart from the second pixel electrode 410 in the second direction DR2. As an example, the second transistor may be provided in a plural number. Accordingly, as shown in FIG. 10A, at least one transistor T21 of the second transistors is disposed in the second gate circuit 210, and at least one transistor T22 of the third transistors is disposed in the third gate circuit 250.

In the present exemplary embodiment, at least a portion of each of the off-switching line 216 and the low voltage line 215 may be disposed in the second display part DA2. For instance, at least the portion of each of the off-switching line 216 and the low voltage line 215 may be overlapped with the second light blocking part 440 when viewed in a plan view.

In the present exemplary embodiment, the second light blocking part 440 prevents the second pixel circuit 420, the third gate circuit 250, and the first gate line GL1 from being visible. The second light blocking part 440 is overlapped with the second pixel circuit 420, the third gate circuit 250, and the first gate line GL1 when viewed in a plan view.

The third gate circuit 250 is not limited thereto or thereby. In the present exemplary embodiment, to achieve a second transmittance of the second display part DA2 that is higher than a first transmittance of the first display part DA1, an area in which the third gate circuit 250 is disposed may be smaller than an area in which the second gate circuit 210 is disposed, or the number of the transistors included in the third gate circuit 250 may be smaller than the number of the transistors included in the second gate circuit 210. In other words, a relationship of N1>N2 or R1>R2 may be satisfied. The N1 denotes the number of transistors of the second gate circuit 210, the N2 denotes the number of transistors of the third gate circuit 250, the R1 denotes the area in which the second gate circuit 210 is disposed, and the R2 denotes the area in which the third gate circuit 250 is disposed. In the present exemplary embodiment, the third gate circuit 250 may include the first transistor T1 instead of the second transistor T22.

Figure 11:
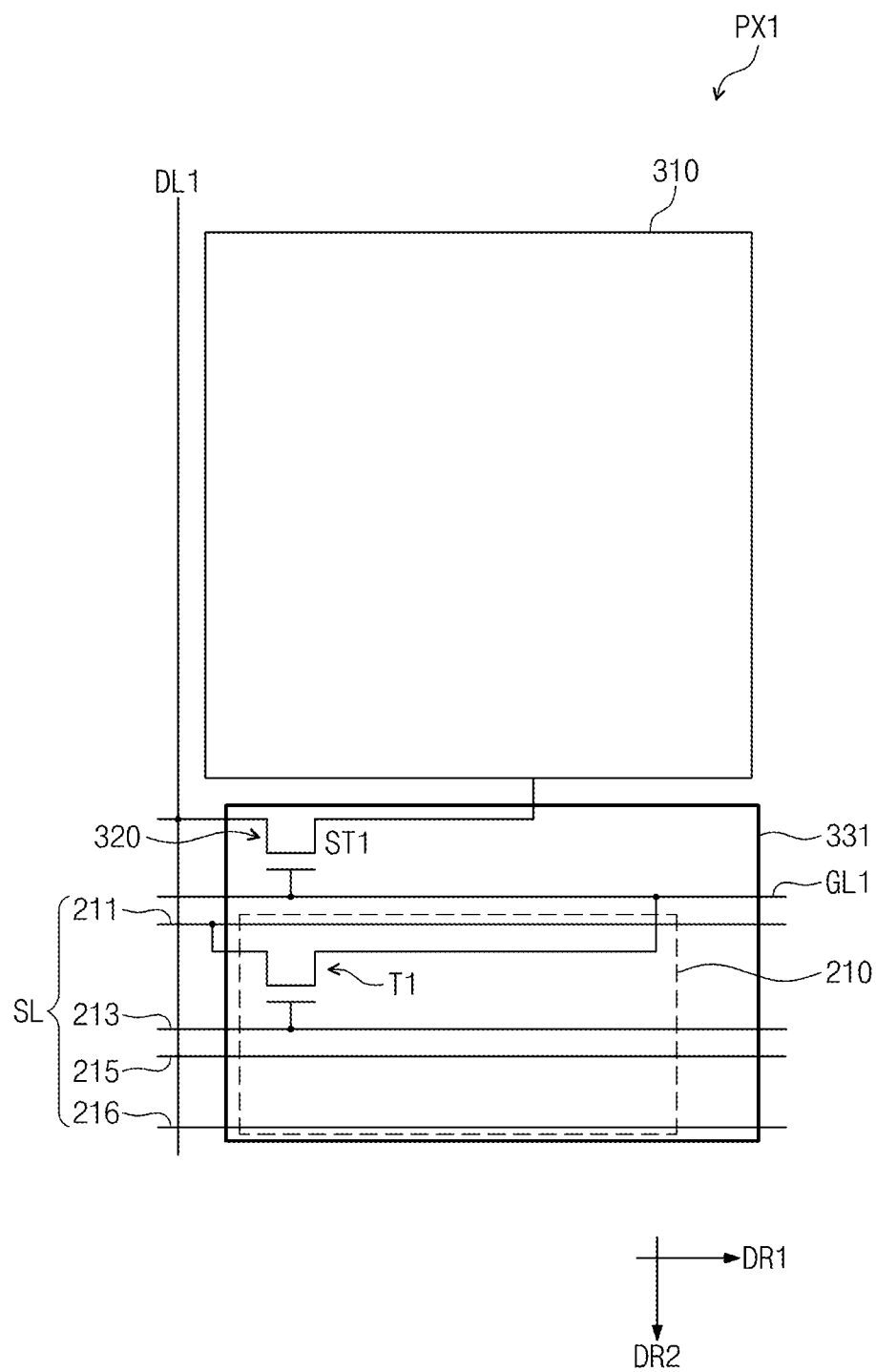
FIG. 11 is a view showing a first pixel shown in FIG. 9 according to an exemplary embodiment of the present disclosure.

FIG. 11 is a view showing a first pixel PX1 shown in FIG. 9 according to an exemplary embodiment of the present disclosure.

Referring to FIG. 11, the second gate circuit 210 may include the first transistor T1 and may not include the second transistor T2.

In the present exemplary embodiment, at least a portion of each of the on-switching line 213, the low voltage line 215 and the off-switching line 216 may be disposed in the first display part DA1. For instance, at least a portion of each of the on-switching line 213, the off-switching line 216 and the low voltage line 215 may be overlapped with the first light blocking part 331.

The first light blocking part 331 prevents the first switching transistor ST1, the second gate circuit 210, and the first gate line GL1 from being visible. The first light blocking part 331 is overlapped with the first switching transistor ST1, the second gate circuit 210, and the first gate line GL1 when viewed in a plan view.

Figure 12:
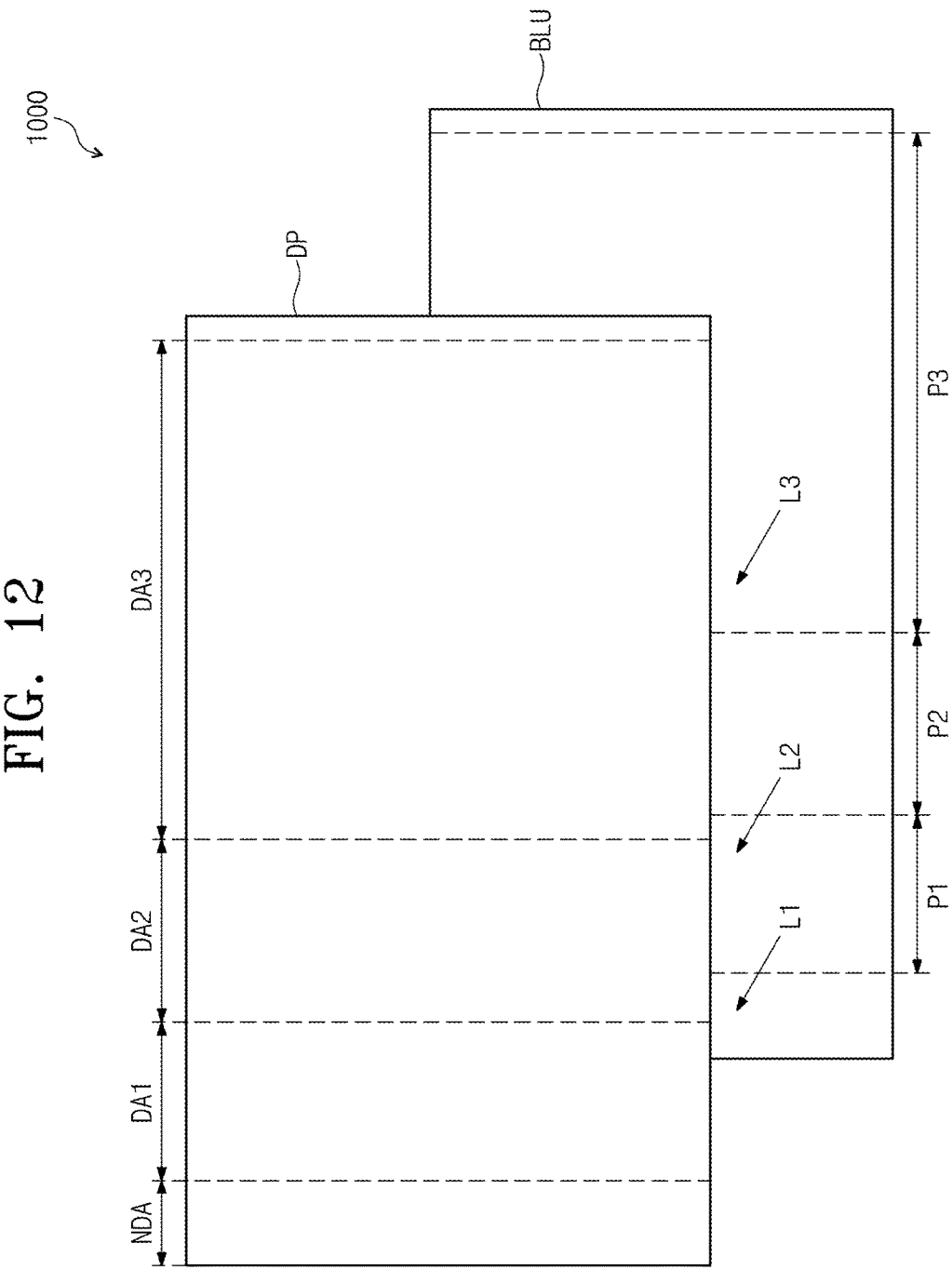
FIG. 12 is a view showing a display apparatus according to an exemplary embodiment of the present disclosure.

FIG. 12 is a view showing a display apparatus 1000 according to an exemplary embodiment of the present disclosure.

Referring to FIG. 12, the display apparatus 1000 may further include a backlight unit BLU, and a display panel DP may be, but not limited to, a liquid crystal display panel.

The backlight unit BLU may include, for example, first, second, and third parts P1, P2, and P3. The first to third parts P1 to P3 are respectively overlapped with the first to third display parts DA1 to DA3 in a plan view. The first, second, and third parts P1, P2, and P3 respectively generate first, second, and third lights L1, L2, and L3, and the first to third lights L1 to L3 are provided to rear surfaces of the first to third display parts DA1 to DA3, respectively.

In the present exemplary embodiment, an intensity of the first to third lights L1 to L3 may be controlled according to the transmittance of the first to third display parts DA1 to DA3. In more detail, since the second transmittance of the second display part DA2 is greater than the first transmittance of the first display part DA1 and smaller than the third transmittance of the third display part DA3, the intensity of the second light L2 may be smaller than the intensity of the first light L1 and greater than the intensity of the third light L3.

As an example, a ratio of intensity among the first to third lights L1 to L3 may be substantially the same as a ratio of the first to third transmittances or a ratio of squares of the first to third transmittances. In the present exemplary embodiment, the ratio of intensity among the first to third lights L1 to L3 may be substantially the same as a ratio of area among the first, second, and third light blocking parts 330, 430, and 530 (refer to FIGS. 3A to 3C) or a ratio of squares of the areas of the first, second, and third light blocking parts 330, 430, and 530.

As described above, the light having a relatively high intensity is provided to the part of the display panel DP having a relatively low transmittance, and thus the boundary between the first and third display parts DA1 and DA3 may be prevented from being recognized due to the difference in transmittance between the first and third display parts DA1 and DA3.

FIG. 13 is a view showing a display panel according to an exemplary embodiment of the present disclosure.

Referring to FIG. 13, first, second, and third image signals IS1, IS2, and IS3 are respectively applied to the first, second, and third display parts DA1, DA2, and DA3. The first to third image signals IS1 to IS3 may be signals having information on images displayed through the first to third display parts DA1 to DA3. The first to third image signals IS1 to IS3 may be external signals provided from the outside, processed signals in the controller CTR, which are obtained by processing the external signals to be suitable for the display panel DP, or the data voltages generated on the basis of the external signals or the processed signals.

In the present exemplary embodiment, a brightness value of the second image signal IS2 is smaller than a brightness value of the first image signal IS1 and greater than a brightness value of the third image signal IS3 when a grayscale value is constant.

As an example, a ratio in brightness value among the first to third image signals IS1 to IS3 may be substantially the same as a ratio of the first to third transmittances or a ratio of squares of the first to third transmittances. In the present exemplary embodiment, the ratio in brightness value among the first to third lights L1 to L3 may be substantially the same as a ratio in area among the first, second, and third light blocking parts 330, 430, and 530 (refer to FIGS. 3A to 3C) or a ratio of squares of the areas of the first, second, and third light blocking parts 330, 430, and 530.

As described above, the image signal having a relatively high brightness value at the same grayscale value is provided to the part of the display panel DP having a relatively low transmittance, and thus the boundary between the first and third display parts DA1 and DA3 may be prevented from being recognized due to the difference in transmittance between the first and third display parts DA1 and DA3.

Although the exemplary embodiments of the present invention have been described, it is understood that the present invention is not limited to these exemplary embodiments and various changes and modifications can be made by one ordinary skilled in the art within the spirit and scope of the present invention as hereinafter claimed.

What is claimed is:

1. A display apparatus comprising:
a display panel comprising a gate line extending in one direction, a non-display part, a first display part, a third display part, and a second display part disposed between the first and third display parts; and
a gate driver comprising a first gate circuit disposed in the non-display part and a second gate circuit disposed in the first display part and applying a gate signal to the gate line,
wherein the first display part comprises a first pixel comprising a first pixel electrode, a first pixel circuit driving the first pixel electrode, and a first light blocking part overlapped with the first pixel circuit and the second gate circuit and exposing the first pixel electrode,
the second display part comprises a second pixel comprising a second pixel electrode, a second pixel circuit driving the second pixel electrode, and a second light blocking part overlapped with the second pixel circuit and exposing the second pixel electrode,
the third display part comprises a third pixel comprising a third pixel electrode, a third pixel circuit driving the third pixel electrode, and a third light blocking part overlapped with the third pixel circuit and exposing the third pixel electrode, and
an area of the second light blocking part is smaller than an area of the first light blocking part and greater than an area of the third light blocking part.

2. The display apparatus of claim 1, wherein the gate line is provided in a plural number, and the second gate circuit is disposed between adjacent gate lines to each other among the gate lines.

3. The display apparatus of claim 2, wherein the second gate circuit comprises a first transistor comprising an input terminal connected to a clock line and an output terminal connected to the gate line.

4. The display apparatus of claim 3, wherein the second gate circuit further comprises a second transistor comprising an input terminal connected to a low voltage line and an output terminal connected to the output terminal of the first transistor.

5. The display apparatus of claim 1, wherein the second pixel electrode has an area greater than an area of the first pixel electrode and smaller than an area of the third pixel electrode.

6. The display apparatus of claim 1, wherein the gate driver further comprises a third gate circuit disposed in the second display part, and the second light blocking part is overlapped with the third gate circuit.

7. The display apparatus of claim 6, wherein an area in which the third gate circuit is disposed is smaller than an area in which the second gate circuit is disposed.

8. The display apparatus of claim 6, wherein a number of transistors included in the third gate circuit is smaller than a number of transistors included in the second gate circuit.

9. The display apparatus of claim 6, wherein the display panel further comprises a clock line receiving a clock signal and a low voltage line receiving a low voltage, the gate driver further comprises a plurality of second transistors, each of the second transistors comprises an input terminal connected to the low voltage line and an output terminal connected to the gate line, the second gate circuit comprises a first transistor comprising an input terminal connected to the clock line and an output terminal connected to the gate line, and the third gate circuit comprises at least one second transistor among the second transistors.

10. The display apparatus of claim 9, wherein at least a portion of the low voltage line and at least a portion of the clock line are disposed in the first and second display parts.

11. The display apparatus of claim 10, wherein the second gate circuit comprises at least another second transistor among the second transistors.

12. The display apparatus of claim 6, wherein the display panel further comprises a plurality of data lines extending in another direction different from the one direction, the second gate circuit is provided in a plural number, an i-th second gate circuit in the one direction among the second gate circuits is disposed between an i-th data line and an (i+1)-th data line among the data lines, and the number "i" is an integer equal to or greater than 1.

13. The display apparatus of claim 12, wherein the third gate circuit is provided in a plural number, a third gate circuit in the one direction among the third gate circuits is disposed between a j-th data line and a (j+1)-th data line among the data lines, and the number "j" is an integer greater than the number "i".

14. The display apparatus of claim 12, wherein the gate line is provided in a plural number, a k-th second gate circuit in the another direction different from the one direction among the second gate circuits is disposed between a k-th gate line and a (k+1)-th gate line among the gate lines, and the number "k" is an integer greater than 1.

15. The display apparatus of claim 1, wherein each of the first display part and the second display part is provided in a plural number, and the first display parts, the second display parts, and the third display part are arranged in order of the first display part, the second display part, the third display part, the second display part, and the first display part along the one direction.

16. The display apparatus of claim 1, wherein each of the first, second, and third display parts is provided in a plural number, and the first, second, and third display parts are arranged in order of the first display part, the second display part, the third display part, the second display part, the first display part, the second display part, the third display part, the second display part, and the first display part along the one direction.

17. The display apparatus of claim 1, further comprising a backlight unit comprising a first part providing a first light to the first display part, a second part providing a second light to the second display part, and a third part providing a third light to the third display part, wherein the second light has an intensity smaller than an intensity of the first light and greater than an intensity of the third light.

18. The display apparatus of claim 1, wherein first, second, and third image signals are respectively applied to the first, second, and third display parts, and the second image signal has a brightness value smaller than a brightness value of the first image signal and greater than a brightness value of the third image signal with respect to a same grayscale value.

19. A display apparatus comprising:
a display panel comprising a gate line extending in one direction, a non-display part a first display part, a third display part, and a second display part disposed between the first and third display parts; and
a gate driver comprising a first gate circuit disposed in the non-display part, a second gate circuit disposed in the first display part and a third gate circuit disposed in the second display part, wherein the gate driver is not disposed in the third display part and applies a gate signal to the gate line, and the second display part has a transmittance greater than a transmittance of the first display part and smaller than a transmittance of the third display part.

20. A display apparatus comprising:
a display panel comprising a gate line extending in one direction, a first display part, a third display part, and a second display part disposed between the first and third display parts; and
a gate driver comprising a first gate circuit disposed in the first display part and a second gate circuit disposed in the second display part, wherein the gate driver is not disposed in the third display part and applies a gate signal to the gate line, a relationship of N1>N2 or R1>R2 is satisfied, the number N1 denotes a number of transistors of the first gate circuit, the number N2 denotes a number of transistors of the second gate circuit, the number R1 denotes an area in which the first gate circuit is disposed, and the number R2 denotes an area in which the second gate circuit is disposed.

21. A display apparatus comprising:
a display panel comprising a gate line extending in one direction,
a non-display part, a first display part, a third display part, and a second display part disposed between the first and third display parts; and
a gate driver comprising a first gate circuit disposed in the non-display part, a second gate circuit disposed in the first display part and a third gate circuit disposed in the second display part,
wherein the gate driver is not disposed in the third display part and applies a gate signal to the gate line,
the first display part comprises a first pixel of a first type,
the second display part comprises a second pixel of a second type,
the third display part comprises a third pixel of a third type, and
an aperture ratio of the second pixel is greater than an aperture ratio of the first pixel and smaller than an aperture ratio of the third pixel.

22. The display apparatus of claim 21, wherein:
each pixel has a light blocking part and a display area that is not overlapped with the light blocking part, and
the aperture ratio of each pixel is a ratio of the display area and the area of the light block part.

23. The display apparatus of claim 21, wherein:
each pixel column contains pixels of the same pixel type,
one or more contiguous columns of pixels of the first type form the first display part,
one or more contiguous columns of pixels of the second type form the second display part, and
one or more contiguous columns of pixels of the third type form the third display part.

24. The display apparatus of claim 23, wherein
the display panel is apportioned into a plurality of display parts along a pixel row direction, and
the plurality of display parts are arranged in order of the first display part, the second display part, the third display part, the second display part, and the first display part along the pixel row direction.

25. The display apparatus of claim 23, wherein
the display panel is apportioned into a plurality of display parts along a pixel row direction, and
the plurality of display parts are arranged in order of the first display part, the second display part, the third display part, the second display part, the first display part, the second display part, the third display part, the second display part, and the first display part along the pixel row direction.

* * * * *